(12) United States Patent
Wheeler et al.

(10) Patent No.: US 11,972,102 B2
(45) Date of Patent: Apr. 30, 2024

(54) SHARING USER INTERFACE CUSTOMIZATION ACROSS APPLICATIONS

(71) Applicant: Microsoft Technology Licensing, LLC, Redmond, WA (US)

(72) Inventors: Joseph Wheeler, Sammamish, WA (US); Aron R. Chavez, Issaquah, WA (US); Christopher M. Novak, Woodinville, WA (US); Chase R. Meusel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/827,464

(22) Filed: May 27, 2022

(65) Prior Publication Data

US 2022/0291822 A1 Sep. 15, 2022

Related U.S. Application Data

(63) Continuation of application No. 16/509,203, filed on Jul. 11, 2019, now Pat. No. 11,379,104.

(Continued)

(51) Int. Cl.
*G06F 3/04847* (2022.01)
*G06F 3/04812* (2022.01)
(Continued)

(52) U.S. Cl.
CPC ...... *G06F 3/04847* (2013.01); *G06F 3/04812* (2013.01); *G06F 3/04817* (2013.01);
(Continued)

(58) Field of Classification Search
CPC ....... G06F 3/04886; G06F 2203/04803; G06F 3/04847; G06F 3/04812; G06F 3/04817;
(Continued)

(56) References Cited

U.S. PATENT DOCUMENTS 10,698,591 B2* 6/2020 Masterson .......... G06F 16/9577
2013/0326397 A1* 12/2013 Kim ...................... G06F 3/0484
715/781

(Continued)

FOREIGN PATENT DOCUMENTS

CN 1609794 A 4/2005
CN 105556468 A 5/2016

OTHER PUBLICATIONS

"Office Action Issued in Indian Patent Application No. 202147050664", Mailed Date: Nov. 15, 2023, 8 Pages.

(Continued)

*Primary Examiner* — Tan H Tran
(74) *Attorney, Agent, or Firm* — Rainier Patents, P.S.

(57) ABSTRACT

Methods, systems, and computer program products are provided for sharing user interface (UI) customization across applications. Application developers may create UIs (e.g., game control layouts) with control groups that may be customizable as a group. A control group may comprise a plurality of controls selectively assigned to cluster of sockets (e.g., a socket group) in a layout template. Controls in control groups may be customized as a group, for example, by changing a position, rotation and/or scale of a control group. Users can customize controls for comfort, switch controls for right and left-handed play and share customized preferences across applications. UI customization may be shared across applications with different UIs. For example, customization of one or more control groups in a first UI may be applied to one or more control groups in other UIs for other applications. Users may avoid tedious, time-consuming individual control changes for many UIs.

20 Claims, 20 Drawing Sheets

Related U.S. Application Data

(60) Provisional application No. 62/858,915, filed on Jun. 7, 2019.

(51) Int. Cl.
  *G06F 3/04817* (2022.01)
  *G06F 3/04845* (2022.01)
  *G06F 3/04886* (2022.01)
  *G06F 9/54* (2006.01)

(52) U.S. Cl.
  CPC ...... *G06F 3/04845* (2013.01); *G06F 3/04886* (2013.01); *G06F 9/54* (2013.01); *G06F 2203/04803* (2013.01)

(58) Field of Classification Search
  CPC .. G06F 3/04845; G06F 9/54; G06F 2209/545; G06F 9/542; G06F 9/451
  See application file for complete search history.

(56) References Cited

U.S. PATENT DOCUMENTS

| | | | |
|---|---|---|---|
| 2014/0071054 A1* | 3/2014 | Koch | G06F 3/017 345/168 |
| 2015/0365306 A1* | 12/2015 | Chaudhri | G06F 3/0484 715/753 |
| 2016/0098172 A1* | 4/2016 | Bacinschi | G06F 8/38 715/747 |
| 2017/0357437 A1* | 12/2017 | Peterson | G06F 40/134 |
| 2018/0039387 A1* | 2/2018 | Cheong | G06F 1/1677 |
| 2019/0042066 A1* | 2/2019 | Kim | G06F 1/1649 |

OTHER PUBLICATIONS

Office Action Received for Chinese Application No. 202080042119.9, mailed on Jan. 31, 2024, 12 pages (English Translation Provided).

\* cited by examiner

SHARING USER INTERFACE CUSTOMIZATION ACROSS APPLICATIONS

CROSS-REFERENCE TO RELATED APPLICATION(S)

This application claims priority to U.S. Provisional Application No. 62/858,915, filed on Jun. 7, 2019, and entitled "SHARING USER INTERFACE CUSTOMIZATION ACROSS APPLICATIONS," the entirety of which is incorporated by reference herein.

BACKGROUND

Application developers may develop user interfaces for user interaction with applications on devices. An example of a user interface (UI) is a touch screen interface that provides a graphical user interface (GUI) that enables a user to interact with a device using touch (e.g., by application of one or more fingers). A GUI may include one or more displayed controls for interaction by the user at a touch screen The layouts of UIs tend to be unique for each application.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for sharing user interface (UI) customization across applications. Application developers may create UIs, such as game control layouts, with control groups that may be customizable as a group. A control group may comprise a plurality of controls selectively assigned to a cluster of sockets, which may be referred to as a socket group, in a layout template. Controls in a control group may be customized as a group by modifying control group as a whole. Users can customize controls individually as well. Furthermore, UI customization may be shared across applications with different UIs.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
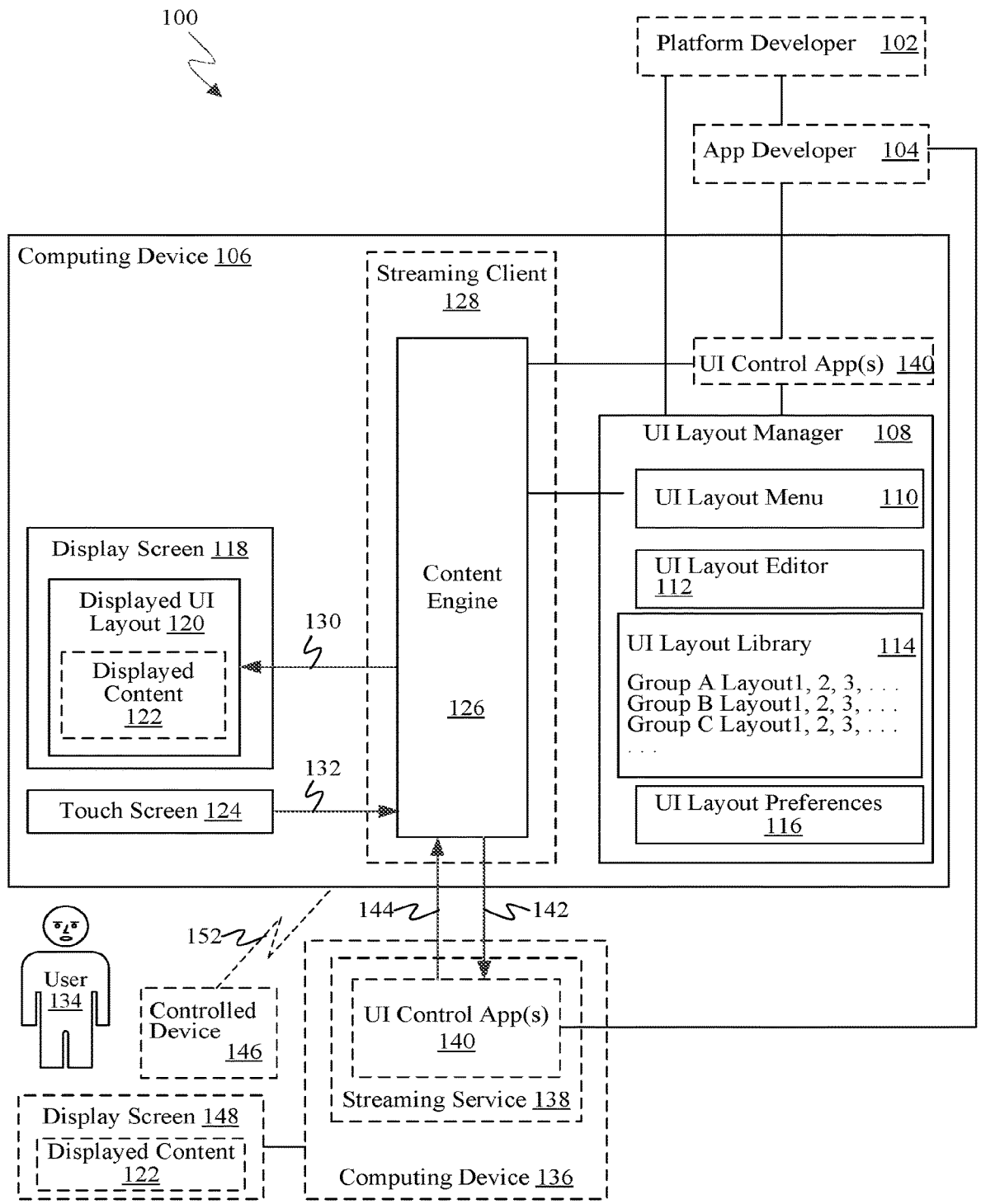
FIG. 1 shows a block diagram of an example system for user interface customization across applications, according to an embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Application developers may develop user interfaces for user interaction with applications on devices. An example of a user interface (UI) is a touch screen interface that provides a graphical user interface (GUI) that enables a user to interact with a device using touch (e.g., by application of one or more fingers). A GUI may include one or more displayed controls for interaction by the user at a touch screen In the context of a GUI, a control is a graphical element configured for interaction by user by touch manipulation to provide an input to an application associated with the GUI. Examples of controls include graphical elements such as buttons, sliders, spinners, drop-down lists/menus, toolbars, icons, etc. The numbers of controls, types of controls, combination of controls, and positioning of controls in UIs tend to be unique for each application.

Accordingly, methods, systems, and computer program products are provided for the customization of UIs, as well as the sharing of user interface (UI) customizations across applications. Application developers may create UIs (e.g., game control layouts) with control groups that may be customizable as a group. A control group may comprise a plurality of controls selectively assigned to cluster of sockets (e.g., a socket group) in a layout template. Controls in control groups may be customized as a group, for example, by changing a position, rotation and/or scale of a control group. Users can customize controls for comfort, switch controls for right and left-handed play and share customized preferences across applications. UI customization may be shared across applications with different UIs. For example, customization of one or more control groups in a first UI may be (e.g., automatically) applied to one or more control groups in other UIs for other applications. Users may avoid tedious, time-consuming individual control changes for many UIs.

FIG. 1 shows a block diagram of an example system 100 for sharing user interface customization across applications, according to an example embodiment. Example system 100 presents several of many possible computing environments. Several components are shown in FIG. 1 with dashes to indicate several optional and alternative configurations, such as to provide a compact representation of multiple example environments. Many other environments not shown may also be used to implement subject matter described herein. Various components presented may or may not be present in any given environment shown by example in FIG. 1 or in examples not shown As shown in FIG. 1, system 100 includes a computing device 106, a computing device 136, a controlled device 146, and a display screen 148. Computing device 106 includes a UI layout manager 108, a UI layout editor 112, a UI layout library 114, a display screen 118, a touch screen 124, a streaming client 128, and one or more UI control apps 140. Computing device 136 includes a streaming service 138, which may include one or more UI control apps 140. Streaming client 128 includes a content engine 126. These features of system 100 are described in further detail as follows.

With reference to system 100 in FIG. 1, an example environment may comprise a user 134 interacting with a UI control app 140 executed by content engine 134 in computing device 106. User 134 may interact with UI control app 140, for example, via touch screen 124 based on a UI, shown as a displayed UI layout 120 displayed by display screen 118. User 134 may control real and/or virtual scenes and/or objects using controls on UI layout 120, for example based on in-person viewing or based on a displayed content 122 displayed by display screen 118.

Another example environment may comprise user 134 interacting with UI layout 120 while computing device 106 acts as streaming client 128 coupled to streaming service 138 in computing device 136, which may be local (e.g., gaming console) or remote (e.g., server-based gaming console over a network such as the Internet). Displayed content 122 that may be generated by execution of UI control app 140 may be provided to display screen 148 (e.g., TV, desktop or laptop computer display), for example, and/or to display screen 118. In an example, a user may use a smart phone or tablet (e.g., computing device 106) as a touch screen controller while watching content displayed on a TV.

User 134 may or may not observe displayed content on display screen 118 or 148. For example, a user may interact with UI layout 120 to control a device in person (e.g., controlled device 146 such as a wired or wireless controlled flying drone, water or terrain vehicle or a ground robot) via wired or wireless communication 152. In an example, computing device 106 may comprise a wired or wireless local or remote control of real or virtual scenes or objects that user 134 may observe and control in one way or another. In another example, computing device 106 may display content and an integrated or overlaid UI. In another example, user 134 may interact with displayed UI layout 120 via a pointing device, such as a mouse or other user input device (e.g., keyboard keys).

Computing devices 106 and 136 may comprise any type of computing device, mobile or stationary, such a desktop computer, a server, a video game console, mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a stationary computing device such as a desktop computer or PC (personal computer), a gaming console/system (e.g., Microsoft Xbox®, Sony PlayStation®, Nintendo Wii® or Switch®, etc.), etc. Examples of computing devices 106 and 136 are presented further below in FIGS. 22 and 23, which show a variety of user input devices, including and in addition to touch screen 124.

Content engine 126 may generate application ("app") data (e.g., by executing UI control app 140) or receive app data streamed by streaming service 138 from computing device 136 executing UI control app 140. Content engine 126 may provide display content 130 to display screen 118 generated by content engine 126 or received by content engine 126 from streaming service 138. Content engine 126 may be configured to display UI layout 120 alone or with displayed content 122 (e.g., as an integral part of displayed content 122 or as a graphical overlay over displayed content 122). Content engine 126 may receive user input events 132 provided by user 134 of computing device 106 interaction (e.g., via touch screen 124) with input controls (e.g., displayed UI layout 120). User input may be provided, for example, via touch screen 124 and/or other user input devices (see, e.g., examples shown in FIGS. 22 and 23). User input data 132 may indicate user actions (e.g., touching touch screen 124 in proximity to particular displayed controls in displayed UI layout 120 on display screen 118) while observing real and/or virtual scenes and/or objects in-person or on a display. As shown in FIG. 1, content engine 126 may process or transmit input data 132 (e.g., to streaming service 138 as user input data 142). User input data 132 may be processed by UI content app 140 to determine control signals and/or subsequent UI control app execution, which may impact app data presented to user 134.

Application (e.g., game) streaming transmits video game data from a first device (e.g., "originating" or "source" device) running an application to a second device (e.g., "client" device) to enable a user to view or interact with the application using the second device. In an example, data of a video game may be streamed from a desktop computer or a gaming console to, for example, a smart phone, tablet or other device with a touch screen (e.g., "touch device") to enable a user to interact with a UI control application using a touch screen. Streaming may enable a user to play a video game on a device for which the video game was not originally designed. For example, game streaming may enable a game that was designed to be played on a video game console with a physical game controller to be interacted with using a touch device. A graphical overlay may be presented on the touch screen device, for example, to permit a user to interact with a UI control application on a touch screen device that it was not designed for. A graphical overlay may provide touch screen controls a user interacts with. User interactions with touch controls may be based on or mapped to physical controls in a physical game controller.

Computing device 106 may be used to view and interact with applications (e.g., video games) that may not be designed for the display and/or input devices available for computing device 106. For example, application content may be streamed from a computing device (e.g., computing device 136). UI control app 140 may be executed on computing device 136 (e.g., a desktop computer, a game console, a remote server with Internet connection, etc.). Streaming service 138 may be configured to stream application data 144 from UI control app 140 to another device, such as computing device 106. Streaming service 138 may be configured to transmit application data 144 over a (e.g., wired and/or wireless) network (e.g., a local area network (LAN) such as a wireless LAN (WLAN) or "Wi-Fi") and/or a wide area network (WAN), such as the Internet).

Streaming service 138 (e.g., at computing device 136) and streaming client 128 (e.g., at computing device 106) may cooperate to present streaming video generated by UI control app 140 (e.g., video game app) executed at computing device 136 as displayed content 122 on display screen 118 coupled to (e.g., integrated with) computing device 106. Streaming service 138 may stream app data 144 (e.g., video and audio data) generated by execution of UI control app 140 to streaming client 128, which may present streamed video to user 134 at computing device 106. Streaming client 128 may stream user input data 142 (e.g., received from user 134 interacting with displayed content 122 via touch screen 124 at computing device 106) to streaming service 138 as user input events to UI control app 140. User 134 may view and interact with UI control app 140 that may or may not be designed for viewing and interaction (e.g., by touchscreen 124) on computing device 106. Examples of server-client streaming services into which embodiments may be incorporated may include, for example, server-client streaming services provided by the Microsoft Xbox® platform and the Steam® platform provided by Valve Corporation.

UI control apps 140 may comprise any application that accepts user input to control real and/or virtual objects, which may be viewed in person or on a display. An application developer 104 may develop UI control apps 140 (e.g., game, drone, robot and other UI control applications) that user 134 may interact with via one or more UIs. Application developers 104 may provide UIs integrated in UI control applications (e.g., UI control apps 140) with integrated or separate UIs to users and/or service providers, such as streaming game service providers.

A UI control application (e.g., created by application developer 104 with one or more UIs) may comprise any application that controls anything, whether real or virtual, based on feedback provided by a user by interacting with a UI. In an example, a user may use visual UI controls to control a real or virtual object in displayed content or a physical/real device (e.g., camera, gimbal, drone, robot). A UI control application may or may not provide displayed content. UI control applications may include, for example, video games, drone control applications, robot control applications, etc. A user may control real and/or virtual objects, for example, by interacting with a displayed computer-generated user interface (UI), e.g., a graphical UI (GUI) or heads up display (HUD), to provide user input to a UI control application. A user may interact with a UI, for example, by using a touch device, a pointing device (e.g., mouse, stylus), keyboard or other user input device.

UI control applications may be adapted to or originally developed for touch devices. In an example, a UI control may be displayed alone or as an overlay over a UI application (e.g., game) displayed on a touch device display.

A UI control application may or may not provide display content. In an example, UI control app 140 may generate real and/or virtual scenery and/or real and/or virtual objects (e.g., persons or characters, vehicles, weapons, tools) for display by display screen 118 and/or display screen 148. In an example, a user may view a controllable real/physical object (e.g., a ground robot or flying drone) in person or as video in a first or third person perspective. Display content provided by a UI control application may, for example, be displayed on the same device a UI is displayed on and/or on separate display. Accordingly, a user may view real or virtual objects on a display of a computing device that provides UI control and/or on a different display. In an example, a UI control may be displayed with display content (e.g., embedded in a game), a UI may be displayed as a graphical overlay over display content, a UI may be displayed on a first display while display content may be displayed on a second display (e.g., computer monitor, TV or digital whiteboard), etc.

UI control application 140 may communicate user control, for example, by utilizing computing device resources, e.g., wireless communications (e.g., cellular, WiFi, BluTooth) or wired communications (e.g., USB).

Application developer 104 may utilize a UI template, for example, to develop one or more UIs to control real or virtual objects via one or more UI control applications 140. Templates may be platform independent and/or application independent. An application developer may develop UI control templates. A platform developer 102 may develop UI control templates and provide them to application developers (e.g., app developer 104) to develop UIs for various UI control applications. In an example, a UI control template may be provided to application (e.g., game) developers, for example, by a platform developer that develops game platforms (e.g., Microsoft Xbox®, Sony PlayStation 4®, Nintendo Switch®). A template may have a control socket configuration or layout. An infinite variety of socket templates may be implemented. Template socket design (e.g., configuration or layout) may be based on, for example, type of UI application, type of controls, type of display device, type of interaction (e.g., handheld finger touch, pointing device), etc. A template may comprise suggested UI control groupings (e.g., central or main control(s) surrounded by satellite controls), suggested locations (e.g., right, left, top, bottom), suggested uses (e.g., primary, secondary, menu, social media).

In an example, a single UI control application may be compatible with multiple UIs from the same or different developers. In an example, a UI may be used to control real or virtual objects in one or multiple applications. UIs may be provided with applications and/or provided separately (e.g., including by third parties). A user of many applications (e.g., a person who plays many games) may use many UIs and potentially many different types of UIs. There may be many categories and subcategories or groups and subgroups of UIs, such as action (e.g., shooter, fighter, platform, stealth), sports (e.g., racing, football), adventure, strategy (e.g., tactical wargames, battle arena), simulation (e.g., flying, combat flying, driving, racing, construction), role-playing.

UI layout 120 may be displayed alone or with displayed content 122 (e.g., as an integral part of displayed content 122 or as a graphical overlay over displayed content 122). Displayed UI layout 120 may comprise an arrangement (e.g., configuration or layout) of one or more graphical controls, referred to herein as a user interface (UI) control configuration or layout, that user 134 may interact with on display screen 118 while UI control app 140 is being executed. UI layout 120 may include any number and type of controls that user 134 may interact with to control (e.g., through UI control app 140) real and/or imaginary objects viewed in-person and/or on a display. In an example, UI layout 120 may include, for example, graphical controls for steering, flying, landing, accelerating, braking, running, jumping, firing, punching, kicking, ducking, etc.

UI layout manager 108 may manage UIs for one or more UI control applications, for example, by providing a menu system that user 134 may interact with, e.g., to acquire, store, browse, select, organize, edit (e.g., customize), create preferences. UI layout manager 108 may be implemented, for example, as a stand-alone application, part of an operating system, a service to applications or an operating system and/or as an integral part of a platform application (e.g., Microsoft Xbox). Platform developer 102 or application developer 104 may, for example, develop UI layout manager 108 to manage UIs that may be created using one or more UI templates (e.g., provided by platform developer 102 to application developer 104). UI layout manager 108 may comprise, for example, UI layout menu 108, UI layout editor 112, UI layout library 114 and UI layout preferences 116. Other implementations may comprise the same, more or fewer components, which may include the same and/or different components.

Figure 5:
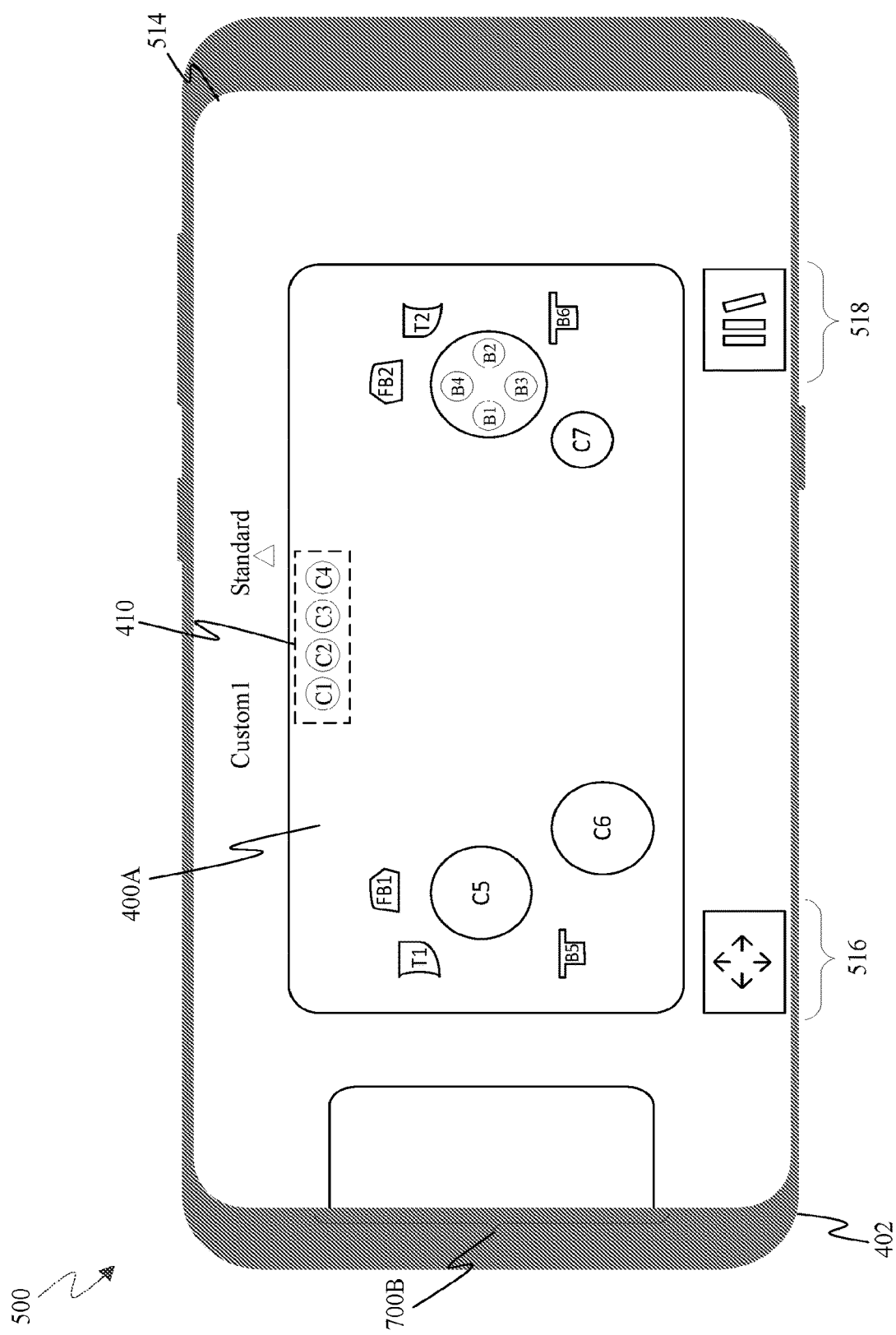
FIG. 5 shows an example of an interface control manager and a first layout group on a touch screen, according to an embodiment.

UI layout menu 110 may provide a navigation menu for user 134 to access and use features provided by UI layout manager 108, such as, for example, acquire, store, browse, select, delete, organize, edit (e.g., customize), create preferences, etc. for UI control layouts. In an example, layout menu 110 may be selectable. UI layout menu 110 may, for example, show user 134 a currently selected group of UI layouts and/or one or more particular UI layouts. UI layout menu 110 may provide user 134 with navigation options, such as, for example: (i) enter active/use mode (e.g., with a first UI control layout in a currently selected group of UI layouts); (ii) select a different UI control layout in a currently selected group of UI control layouts; (iii) select edit mode to edit one of the plurality of UI control layouts in the currently selected group of UI layouts; (iv) select library mode to browse a plurality of groups of UI control layouts, etc. FIG. 5 shows one of many possible example implementations of UI layout menu 110.

UI layout library 114 may provide a library of UI control layouts that may be organized, for example, by groups (e.g., Group A, B, C) and/or subgroups, by application type, by application title, by UI controls, etc. UI layout library 114 may be searchable, for example, by groups and/or subgroups, by application type, by application title, by UI controls, etc. UI layout library 114 may be provided with UI control layouts and/or may search for UI control layouts. UI layout library 114 may organize UI control layouts based on default settings and/or user settings. UI layout library 114 may comprise none or more groups. Each group in UI layout library 114 many comprise none or more UI control layouts.

Figure 13:
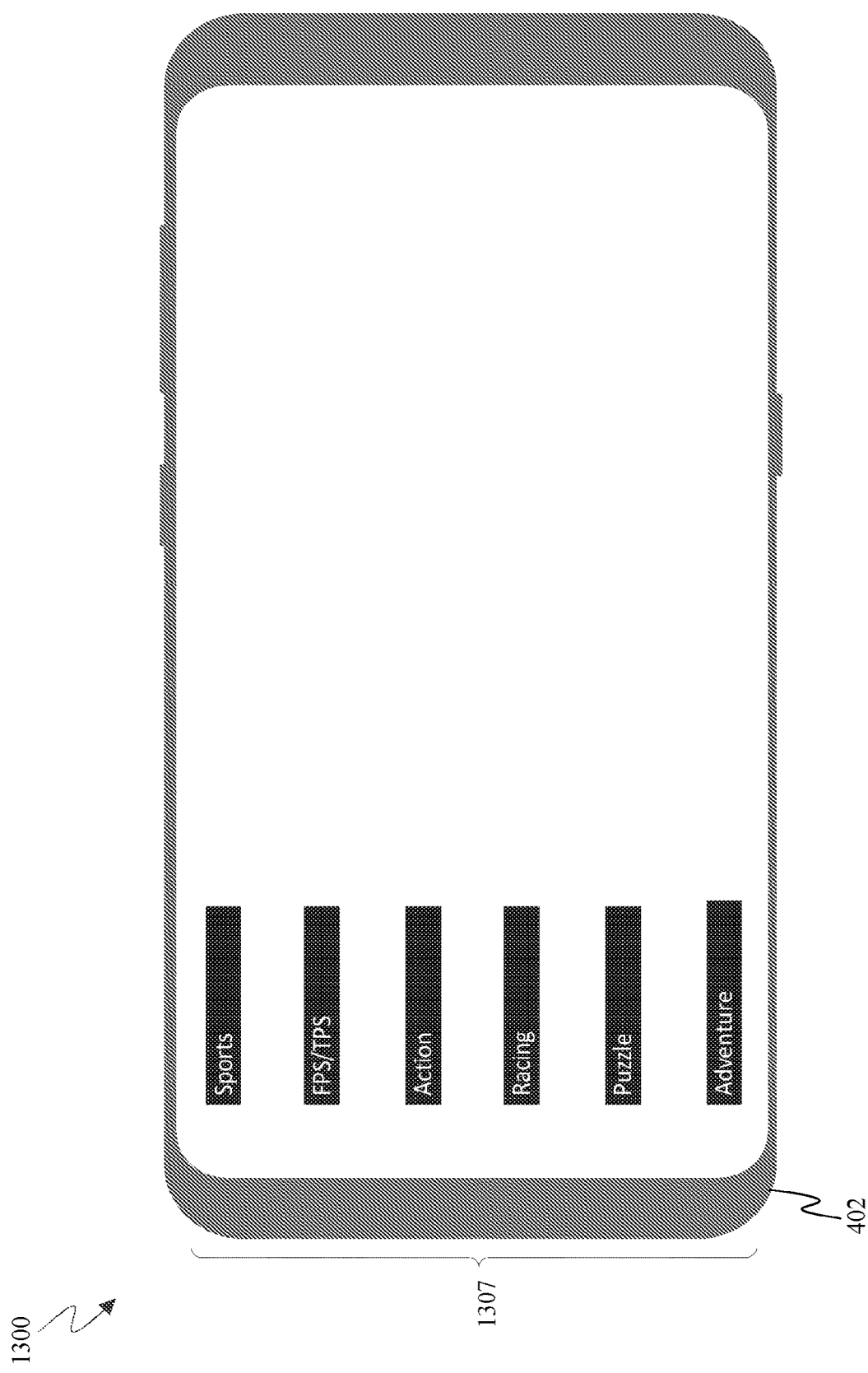
FIG. 13 shows an example of browsing a library of groups of control layouts on a touch screen, according to an embodiment.

FIG. 13 shows one of many possible example implementations of browsing UI layout library 114.

UI layout editor 112 may permit user 134 to edit (e.g., customize) one or more UI control layouts. A user may choose to customize, for example, for comfort, for dominant hand or for any other purpose. For example, hand and finger dimensions may vary dramatically from child to child and adult to adult. Similarly, computer devices and how they are held may vary from device to device and user to user. A left-handed user may, for example, swap sides of a first control group and a second control group. Edits may be made, for example, as UI-specific, UI-category specific, universal, etc.

In an example, user 134 may customize one or more control groups in a UI control layout, for example, by customizing a position, rotation (e.g., angle) or scale of one or more control groups. User 134 may, for example, create a user preference that control groups, such as right control group and left control group (e.g., regardless of UI control application), should (e.g., always) be in a particular position, in a particular size (e.g., size of active/contact area and/or icon), with a particular rotation and/or a particular scale.

In an example, user 134 may customize one or more controls, for example, by moving a control from a first socket to a second socket. User 134 may, for example, select (e.g., touch and hold) a control (e.g., in first or second control groups) and drag it to a new location (e.g., in first or second control groups). User 134 may, for example, create a user preference that particular controls (e.g., regardless of UI control application) should (e.g., always) be in a particular position in a particular size (e.g., size of active/contact area and/or icon).

Figure 8:
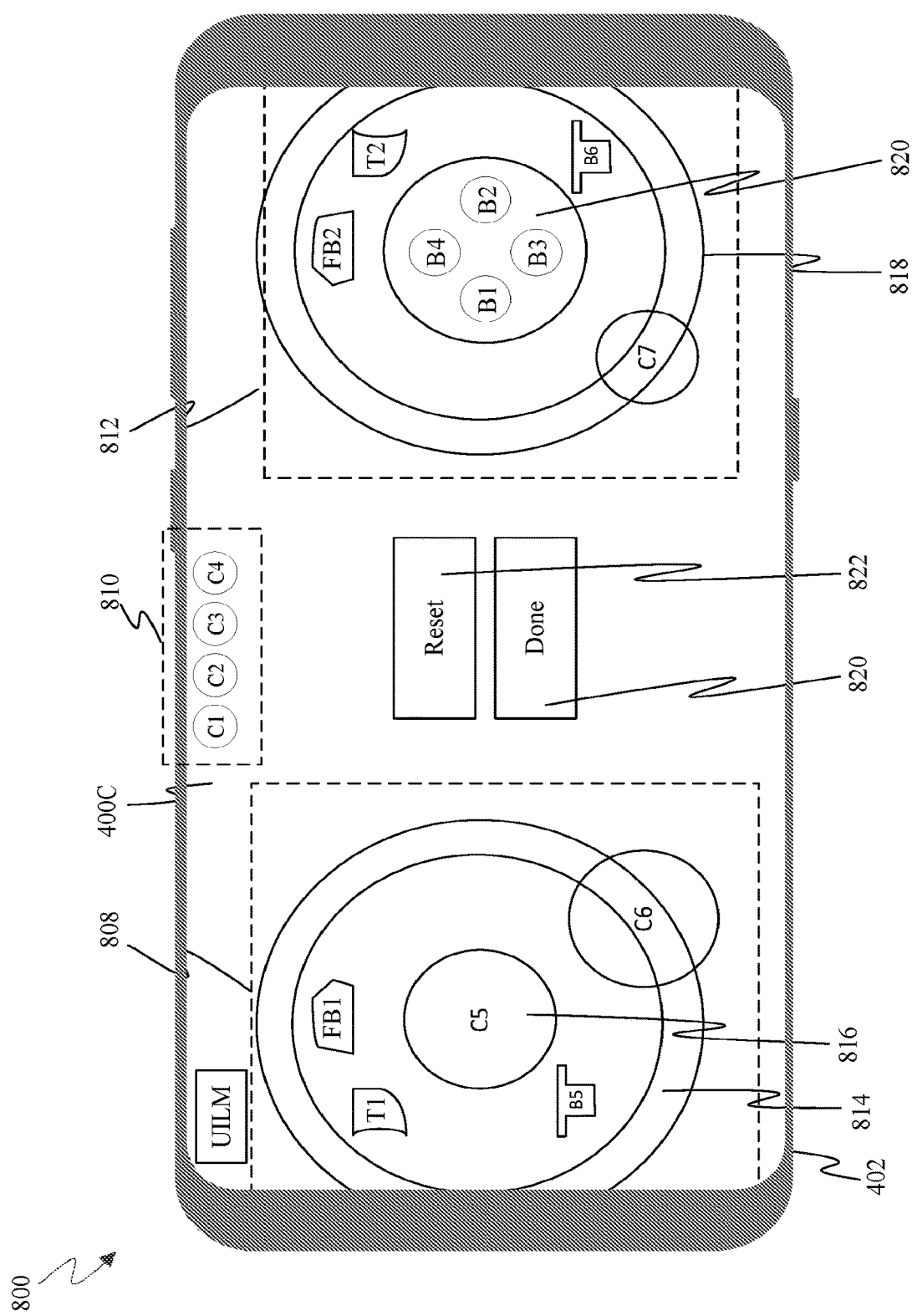
FIG. 8 shows an example of the first control layout in a layout editor on a touch screen, according to an embodiment.
Figure 9:
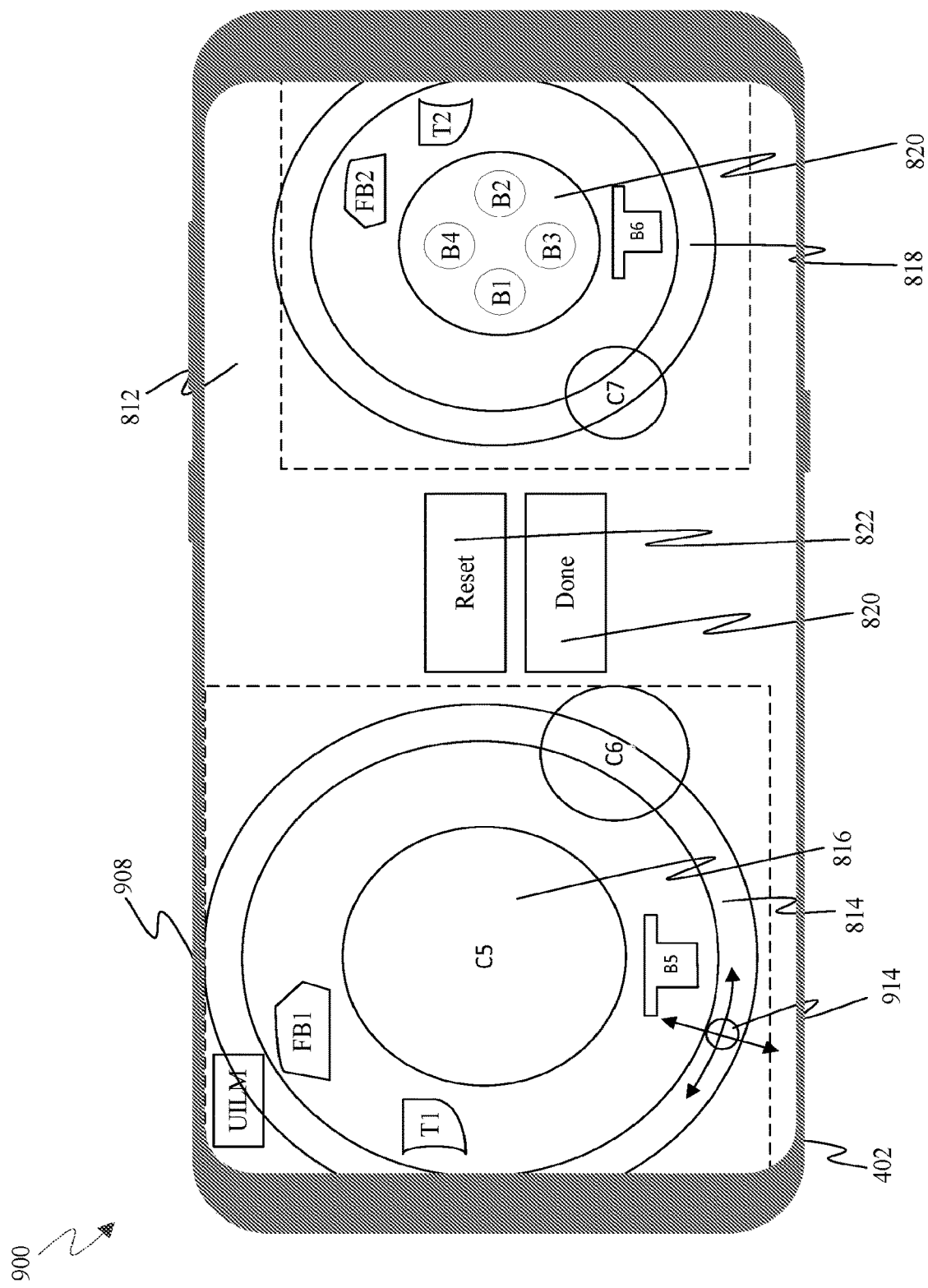
FIG. 9 shows an example of scaling and rotating the left control group in the first control layout on a touch screen, according to an embodiment.
Figure 10:
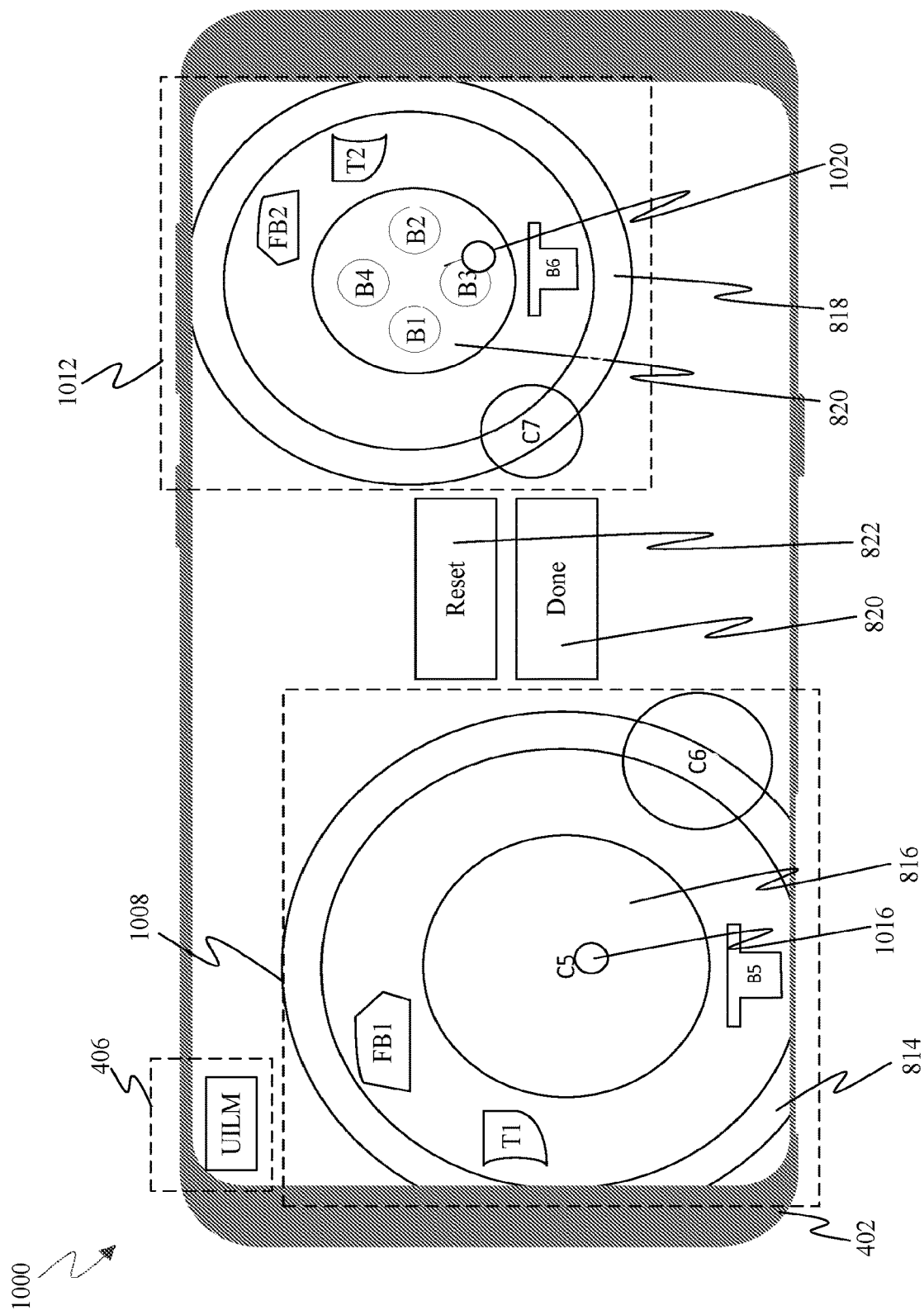
FIG. 10 shows an example of simultaneously repositioning right and left control groups in the first control layout on a touch screen, according to an embodiment.

FIGS. 8-10 show a few of many possible example implementations of UI layout editor 112 for illustrative purposes, and are described in further detail further below.

UI layout preferences 116 may be specified by user 134. Preferences may include, for example, specifying a list of settings applicable to one or more UI control layouts (e.g., icon dimensions). User 134 may specify whether one or more preferences should be applied (e.g., automatically) to one or more (e.g., a subset or all) UI control layouts. Preferences may (e.g., also) be created, for example, by editing one or more UI control layouts. For example, user 134 may edit a first UI control layout with two control groups, for example, by customizing a position, rotation and/or scale of the control groups. Customization may be applied (e.g., based on default and/or user preferences), for example, to other UI control layouts with two control groups. FIGS. 8-11, 12, 14 and 15 show a few of many possible example implementations of creating user customization preferences by editing a UI control layout and applying them to UI control layouts, and are described in further detail further below.

Figure 2:
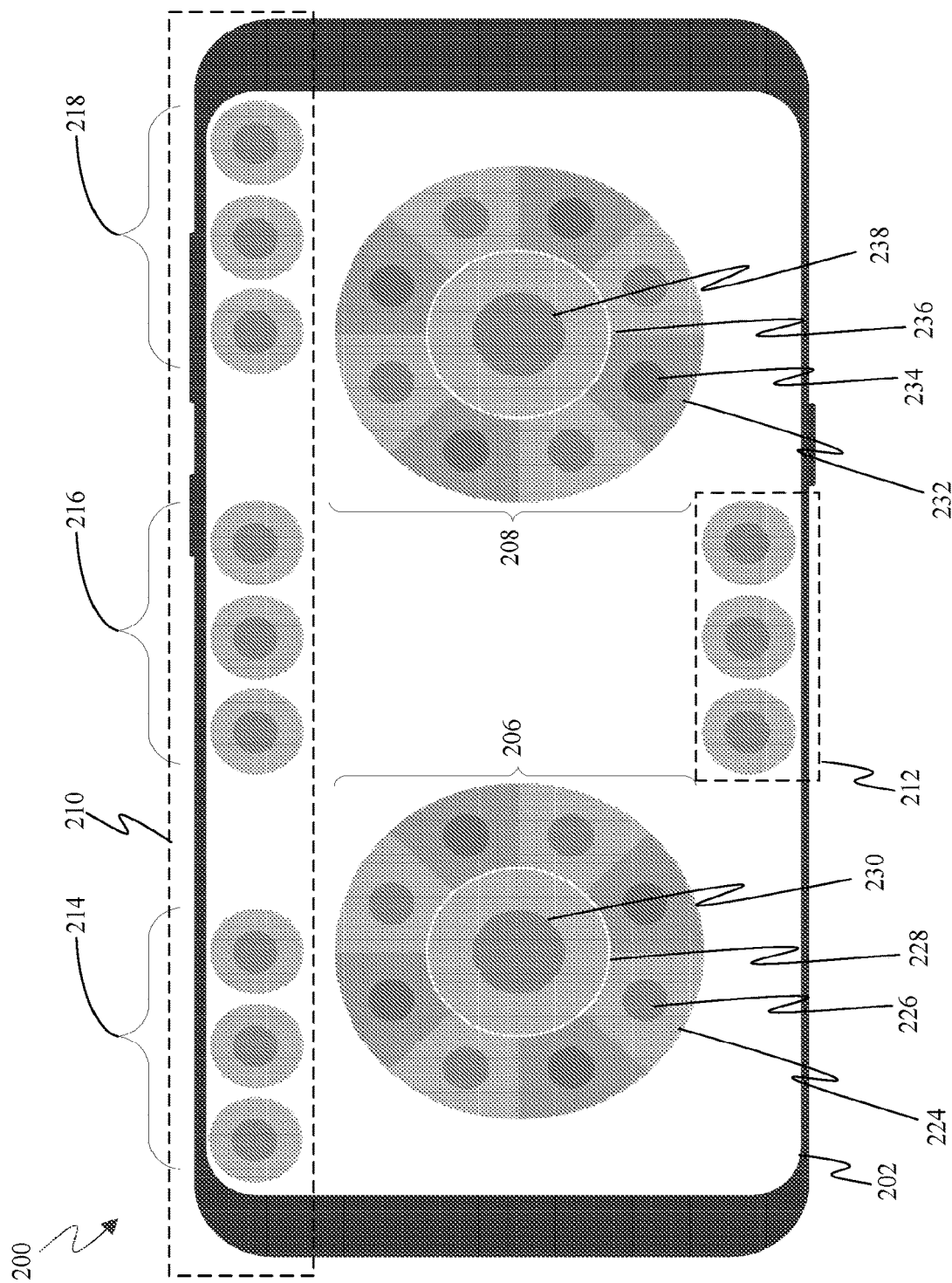
FIG. 2 shows an example of a control socket template on a touch screen, according to an embodiment.

FIG. 2 shows an example of a control socket template, according to an example embodiment. Example template 200 is displayed on touch screen display 202 (e.g., cell phone, tablet, digital whiteboard), although embodiments may be implemented with any type of computing device and any type of display. Example template 200 presents a visual representation of (display output generated by) computer-executable code (e.g., a program).

A control socket template may be provided to application (e.g., game) developers, for example, by a platform developer that develops platforms (e.g., Microsoft Xbox®, Sony PlayStation 4®, Nintendo Switch®). Templates may be platform independent and/or application independent. An application developer may have their own templates. A template socket configuration or layout may provide, for example, suggested UI control groupings (e.g., central or main control(s) surrounded by satellite controls), suggested locations (e.g., right, left, top, bottom), suggested uses (e.g., primary, secondary, menu, social media). An infinite variety of socket templates may be implemented. Template socket design (e.g., configuration or layout) may be based on, for example, type of UI application, type of controls, type of display device, type of interaction (e.g., handheld finger touch, pointing device), etc.

Application developers may utilize a template, for example, to develop one or more UIs to control real or virtual objects via one or more applications. In an example, a single UI control application may be compatible with multiple UIs from the same or different developers. In an example, a single UI may be used to control real or virtual objects in one or multiple applications. UIs may be provided with applications and/or provided separately (e.g., including by third parties). A user of many applications (e.g., a person who plays may games) may use many UIs and potentially many different types of UIs. There may be many categories and subcategories or groups and subgroups of UIs, such as action (e.g., shooter, fighter, platform, stealth), sports (e.g., racing, football), adventure, strategy (e.g., tactical wargames, battle arena), simulation (e.g., flying, combat flying, driving, racing, construction), and role-playing.

A platform developer or other developer may (e.g., further) provide application users with a UI manager to manage UIs created using one or more templates. A UI manager may be, for example, a stand-alone application, part of an operating system, a service to applications or an operating system and/or integrated into a platform application. UIs may be managed, for example, in a library that may be (e.g., selectively) organized, e.g., by groups and/or subgroups, by application type, by application title, by UI controls, etc. One or more sockets may be used to access UI management.

A template may comprise any number of individual and/or grouped sockets. A socket may represent a programmable location that one or more controls may be inserted into (e.g., assigned to, associated with). Sockets may be used (e.g., associated with a control) or unused (e.g., not associated with a control) in whole or in part. In an example, a socket may be split and/or combined (e.g., with other portion(s) of a socket(s) or complete socket(s)). Sockets may be grouped, for example, by one or more characteristics, such as relative position or proximity Grouped sockets may be manipulated as a group. For example, a socket group may change position, rotation and/or scale collectively, as a group.

In the example of FIG. 2, template 200 comprises a first socket group 206, a second socket group 208, a third socket group 210, and a fourth socket group 212. Sockets may have different sizes. In the example of FIG. 2, sockets of template 200 may be a first size (e.g., size 1), other than the center sockets 228, 236 in first and second control groups 206, 208, which may be a second size (e.g., size 2). Combined first socket group 206 and combined second socket group 208 may be a third size (e.g., size 3). Controls may have different sizes that may be suitable for one or more sizes of sockets, for example, based on an ability for a user and/or device to reliably distinguish between controls. In an example, button, joystick, touch pad and throttle controls may be suitable for sizes 1, 2 and 3. A larger directional (D)-pad control may be suitable for size 2 and 3 sockets (e.g., but maybe not size 1). A set of flight buttons may be suitable for size 3 (e.g., but maybe not size 1 and 2). Scaling socket groups (e.g., to increase and/or decrease distance between sockets may impact sizing.

First socket group 206 may be referred to, for example, as a left hand (LH) socket group or left wheel. Left wheel 206 is shown with concentric circles (e.g., a center socket surrounded by satellite sockets). Left wheel 206 may have any shape, e.g., round, square, rectangle, triangle, regular polygon, irregular polygon, star, hub and spoke, etc. Left wheel 206 comprises center socket 228, which may represent an active (e.g., hit or touch) area for a control associated with socket 228. An icon 230 may be associated with center socket 228, for example, to graphically depict a purpose of a control associated with center socket 228 and/or to identify a center and/or active area for center socket 228. Surrounding center socket 228 are eight outer or satellite sockets, e.g., represented by satellite socket 224. A touch area of satellite socket 224 is shown with an irregular shape, with linear sides and curved sides (e.g., a pie slice with the center removed). Satellite sockets may have any shape. An icon 226 may be associated with satellite socket 224, for example, to graphically depict a purpose of a control associated with satellite socket 224 and/or to identify a center and/or active area for satellite socket 224.

Second socket group 208 may be referred to, for example, as a right hand (RH) socket group or right wheel. Right wheel 208 is shown with concentric circles (e.g., a center socket surrounded by satellite sockets). Right wheel 208 may have any shape, e.g., round, square, rectangle, triangle, regular polygon, irregular polygon, star, hub and spoke, etc. Right wheel 208 comprises center socket 236, which may represent an active (e.g., hit or touch) area for a control associated with center socket 236. An icon 238 may be associated with center socket 236, for example, to graphically depict a purpose of a control associated with center socket 236 and/or to identify a center and/or active area for center socket 236. Surrounding center socket 236 are eight outer or satellite sockets, e.g., represented by satellite socket 232. A touch area of satellite socket 232 is shown with an irregular shape, with linear sides and curved sides (e.g., a pie slice with the center removed). Satellite sockets may have any shape. An icon 234 may be associated with satellite socket 232, for example, to graphically depict a purpose of a control associated with satellite socket 232 and/or to identify a center and/or active area for satellite socket 232.

Third socket group 210 may be referred to, for example, as an upper tray. Upper tray 210 may comprise, for example, left socket group 214, center socket group 216 and right socket group 218. Each socket group is shown with three sockets having round shapes. Various implementations of templates may or may not have an upper tray and may have any number of socket groups (e.g., including zero), any number of sockets and any shapes suitable for display and interaction. Socket groups in upper tray 210 may be organized, for example, for menu access controls (e.g., Xbox menu, UI manager menu), social media access controls, input controls, reserved and so on. As indicated, sockets may be associated with icons to graphically depict a purpose of a control associated with sockets and/or to identify a center and/or active area for sockets.

Fourth socket group 212 may be referred to, for example, as a lower tray. Lower tray 212 may comprise, for example, a center socket group. Fourth socket group 212 is shown with three sockets having round shapes. Various implementations of templates may or may not have a lower tray and may have any number of socket groups (e.g., including zero), any number of sockets and any shapes suitable for display and interaction. Sockets in lower tray 212 may be organized, for example, for secondary control actions. As indicated, sockets may be associated with icons to graphically depict a purpose of a control associated with sockets and/or to identify a center and/or active area for sockets.

Sockets shown in FIG. 2 may be reshaped, repositioned, separated, split, combined and/or manipulated in any other way. Sockets shown in FIG. 2 may be assigned to controls or may be unused to create control groups and UI control layouts. Sockets shown in FIG. 2 are merely examples. An unlimited number of examples may be implemented.

FIGS. 3A-3G show examples of selective configuration of sockets and socket groups in a touch control socket template, according to an example embodiment. FIGS. 3A-3G demonstrate (e.g., by example) how App developer 104 or user 134 may selectively utilize sockets in example socket group 300 to create example control group 312. It may be observed that example control group 312 provides controls available on a right hand side of a Microsoft Xbox controller. Of course, FIGS. 3A-3G represent one of an unlimited number of examples of sockets and selective assignment of controls to sockets.

Figures 3A, 3B, 3C, 3D, 3E, 3F, 3G:
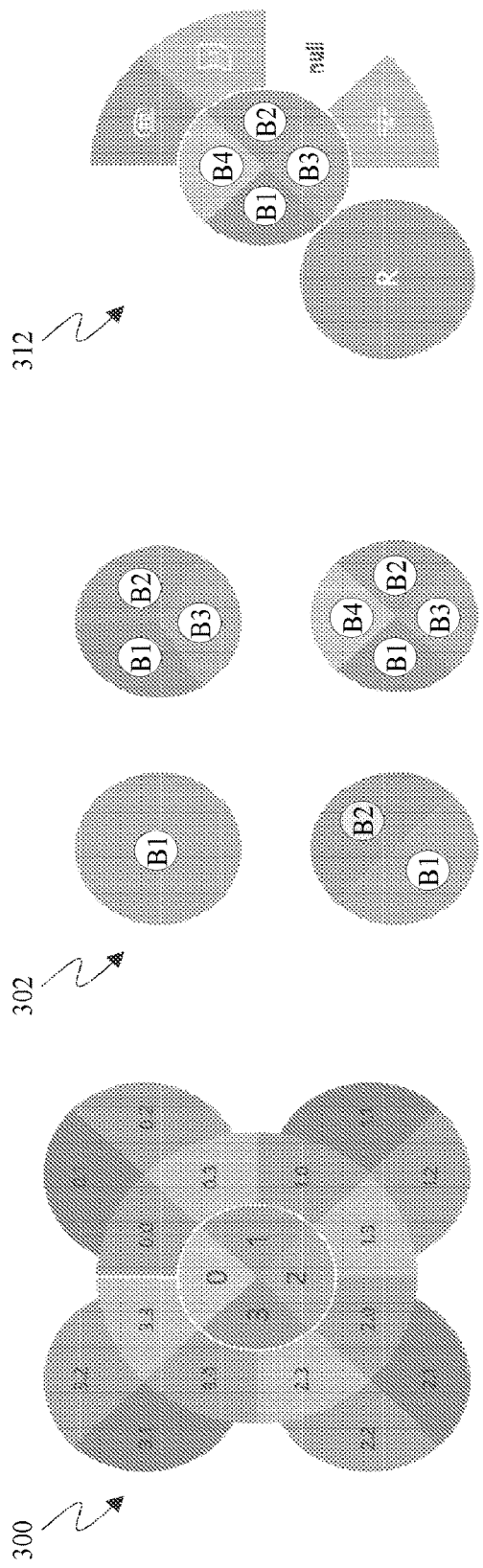
FIGS. 3A-3G show examples of selective configuration of sockets and socket groups in a touch control socket template, according to embodiments.

FIG. 3A shows example socket group 300, which may be implemented in a UI control socket template. Socket group 300 comprises a first (e.g., center) region, a second region formed by two concentric circles and a third region with four lobes. First region comprises four sockets 0, 1, 2, 3. Second region comprises eight sockets that are numbered relative to each of the four lobes (e.g., second region sockets 0.0 and 0.3 are adjacent first lobe sockets 0.1 and 0.2, second region sockets 1.0 and 1.3 are adjacent second lobe sockets 1.1 and 1.2, second region sockets 2.0 and 2.3 are adjacent third lobe sockets 2.1 and 2.2 and second region sockets 3.0 and 3.3 are adjacent fourth lobe sockets 3.1 and 3.2. Sockets may identify active (e.g., touch, hit, point) regions (e.g., for controls assigned to the sockets).

FIG. 3B shows center socket 302 and various examples that combine, divide and reconfigure sockets 1, 2, 3, 4. As the examples show, sockets 1, 2, 3, 4 may be combined (e.g., having a larger combined size) and assigned to a single control B1, combined and assigned to two controls B1, B2, combined and/or split (e.g., in part) and assigned to three sockets B1, B2, B3 or assigned as is with four sockets to four controls B1, B2, B3, B4.

FIGS. 3C-3F show several examples of assigning controls to sockets in the second region adjacent the third lobe in the third region in FIG. 3A. FIGS. 3C-3F show (e.g., faded) sockets assigned to controls, e.g., center sockets 0, 1, 2, 3, sockets 0, 1, 2 (null) and 3 in the second area. FIG. 3C shows unassigned sockets 4.0, 4.1, 4.2 and 4.3, which are renumbered from sockets 2.0, 2.1, 2.2, 2.3 in FIG. 3A. As shown in FIG. 3C, sockets 4.0, 4.1, 4.2 and 4.3 may be used as is (e.g., as provided in a template) and assigned to four controls.

FIG. 3D shows an alternate configuration of four sockets 4.0, 4.1, 4.2 and 4.3 shown in FIG. 3C as three sockets 4.0, 4.3 and 4.1. Socket 4.1 in FIG. 3D consumes part of the active areas defined by sockets 4.0, 4.1, 4.2 and 4.3 shown in FIG. 3C and has a different shape (e.g., circular) than sockets 4.1 and 4.2 in FIG. 3C. The shape (e.g., active touch area) of sockets 4.0 and 4.3 in FIG. 3D is different than the shape of sockets 4.0 and 4.1 in FIG. 3C due to the imposing circular shape of socket 4.1.

FIG. 3E shows an alternate configuration of four sockets 4.0, 4.1, 4.2 and 4.3 shown in FIG. 3C as two sockets 4.0 and 4.1, where socket 4.0 in FIG. 3E combines sockets 4.0 and 4.3 in FIG. 3C. Socket 4.1 in FIG. 3E consumes part of the active areas defined by sockets 4.1 and 4.2 shown in FIG. 3C and has a different shape (e.g., circular) than sockets 4.1 and 4.2 in FIG. 3C.

FIG. 3F shows an alternate configuration of four sockets 4.0, 4.1, 4.2 and 4.3 shown in FIG. 3C as one socket 4.0. Socket 4.0 in FIG. 3E combines sockets 4.0, 4.1, 4.2 and 4.3 in FIG. 3C. Socket 4.0 in FIG. 3E has a different shape (e.g., circular) and consumes a portion (e.g., less than all) of the active areas defined by sockets 4.1, 4.2, 4.3 and 4.4 shown in FIG. 3C.

FIG. 3G shows the socket group configuration (e.g., layout) in FIG. 3F assigned to controls, creating control group configuration (e.g., layout) 312. For example, socket 4.0 in FIG. 3F is assigned to right joystick (R) control. Second (e.g., satellite) area socket 3 is assigned to right joystick press control. Second (e.g., satellite) area socket 2 is assigned to null (unused or TBA). Second (e.g., satellite) area socket 1 is assigned to right trigger (RT) control. Second (e.g., satellite) area socket 0 is assigned to right bumper (RB) control. Center sockets 0, 1, 2, 3 are assigned to B4, B2, B3, B1 button controls, respectively. Icons associated with sockets are displayed in control group 312.

Control Group 312 may be created, for example, by a developer (e.g., based on a socket template). Control group 312 may be customized (e.g., by an end user) as a group (e.g., by changing position, rotation and/or scale collectively, as a group). Individual sockets and controls may be customized (e.g., by an end user), for example, by moving a control from a first socket to a second socket, swapping control positions (e.g., by swapping sockets), etc. In an example, a user may swap the positions of RT control and RB control or move RB control from socket 0.0 (see, e.g., FIG. 3A) to socket 0.1.

Figure 4A:
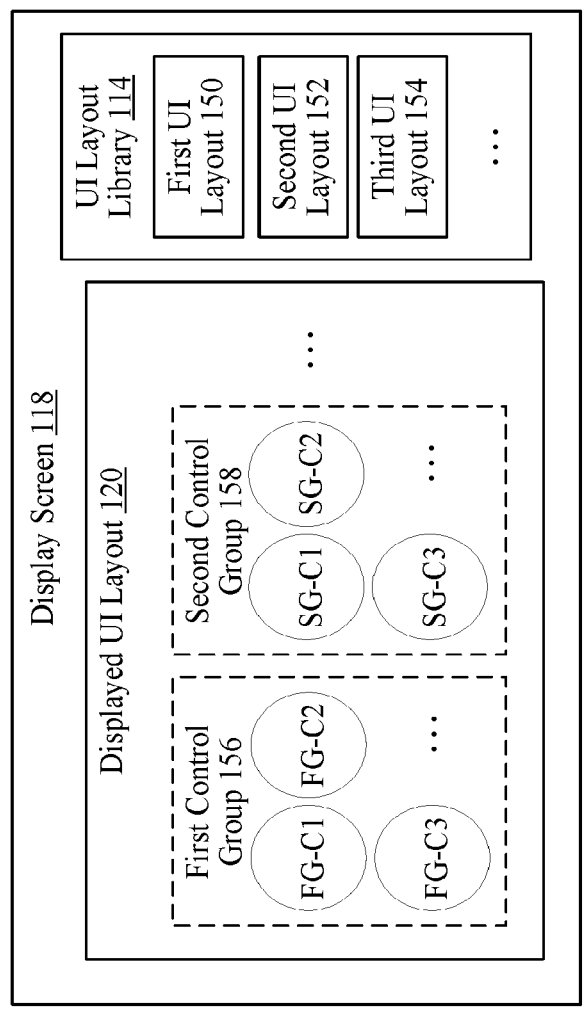
FIG. 4A shows an example of a control layout and control layout library on a touch screen, according to an embodiment.
Figure 4A:
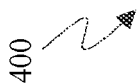

In embodiments, control layouts containing control groups may be configured in various arrangements, and such control layouts of various arrangements may be stored in a library for selection therefrom for editing and during game play. For instance, FIG. 4A shows a block diagram of a control layout and control library displayed on display screen 118 of an example display device 400, according to an embodiment. In particular, display device 400 displays on display screen 118 a split screen example presented to a user (e.g. user 134) that includes UI layout 120 and UI layout library 114. Displayed UI layout 120 may comprise, for example, a current selection of a UI layout from UI layout library 114. Displayed UI layout 120 comprises, for example, at least first control group 156 and second control group 158. First control group 156 may comprise any number of controls, such as, for example, at least FG-C1, FG-C2 and FG-C3. Second control group 158 may comprise any number of controls, such as, for example, at least SG-C1, SG-C2 and SG-C3. Other examples may display more or fewer control groups and controls in control groups. UI layout library 114 may be minimized (e.g. reduced to a small icon or indicator to increase the size of displayed UI layout 120. UI layout library 114 comprises, for example, at least first UI layout 150, second UI layout 152 and third UI layout 154. A user may, for example, scroll up and down to see (e.g. an select) other groups of UI layouts in UI layout library 114. A (e.g. each) group may comprise zero or more UI layouts.

Any number of UI layouts may be included in UI layout library 114. In an example, UI layout groups may be organized (e.g., as groups) based on application titles. In other implementations, UI layout groups may be organized (e.g., as groups) based on any organizational characteristic(s) (e.g., by socket template, by type of controls and so on). Searches may be performed, for example, to find, select and/or organize UI control layouts, e.g., based on features or characteristics. Such UI control layouts may be configured to include any number of controls in any number of control groups, and be selected from any number and configuration of control layouts in libraries, such as according to the examples described as follows with respect to FIGS. 4B and 5-21.

Figure 4B:
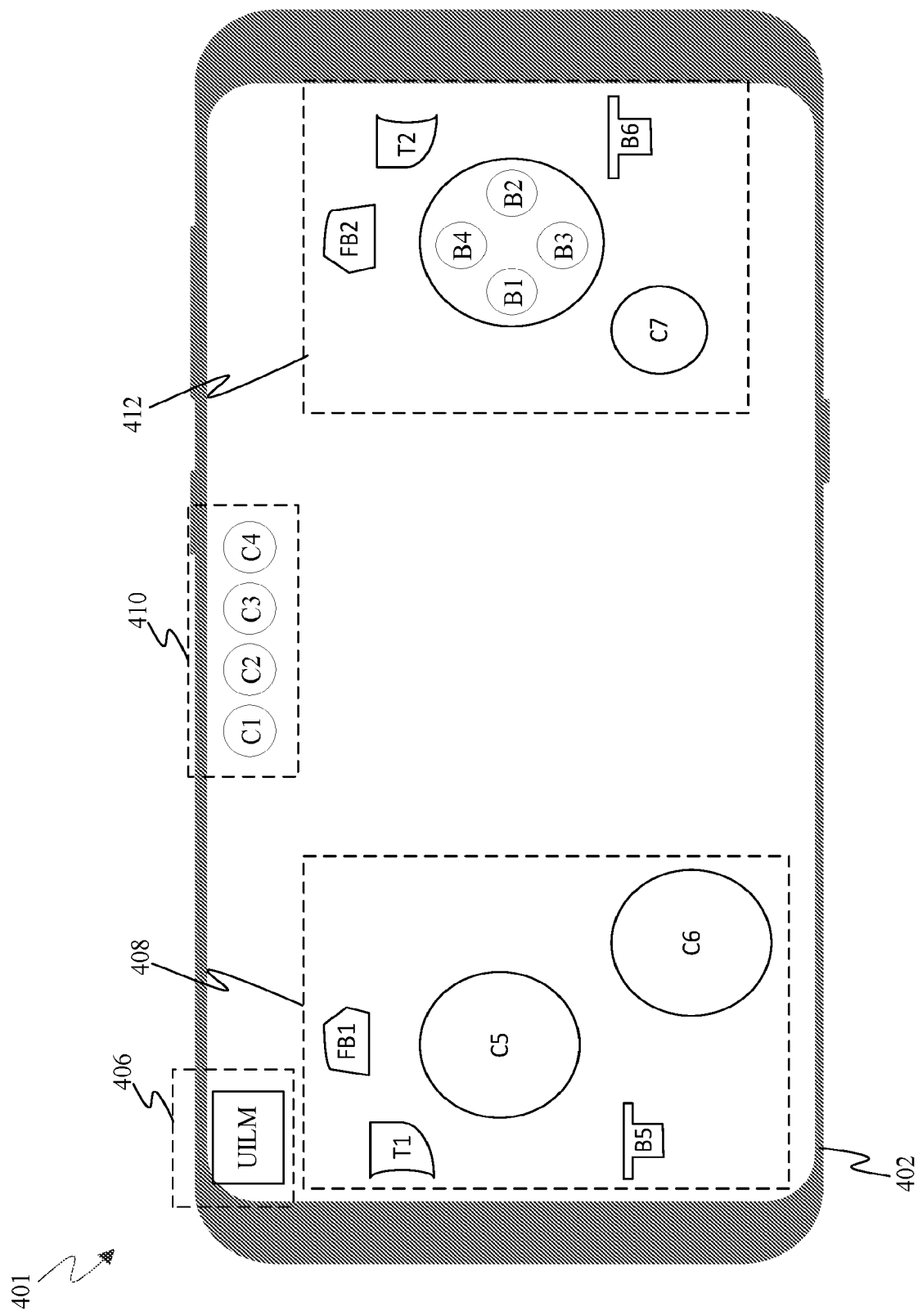
FIG. 4B shows an example of an active first control layout on a touch screen, according to an embodiment.

FIG. 4B shows an example of an active first control layout, according to an example embodiment. Example (e.g., first) UI control layout 401 may be displayed on (e.g., positioned and scaled for) any display device. In an example, (e.g., as shown in FIG. 4B), UI control layout 401 may be displayed on a touch screen device display 402 (e.g., smart phone, tablet). First control layout 401 shows controls assigned to control sockets (e.g., in a control socket template).

A user may interact with controls in first control layout 401 to provide user input that may be processed to control real and/or virtual objects. First UI control layout 401 may comprise, for example, UI layout manager (UILM) 406, first control group 408, second control group 412 and third control group 410.

When positioned as shown in FIG. 4B, first control group 408 may be referred to, for example, as a left or left hand (LH) control group or wheel. First control group 408 may comprise any number and combination of controls. For instance, in embodiments, first control group 408 may include, for example, one or more of a left joystick (C5), a left stick press (B5), a directional pad (C6), a left trigger (T1), a left finger button (FB1), a button, a touch pad, etc.

When positioned as shown in FIG. 4B, second control group 412 may be referred to, for example, as a right or right hand (RH) control group or wheel. Second control group 412 may comprise one or more of any number and combination of controls. For instance, in embodiments, second control group 412 may include, for example, a right joystick (C7), a right stick press (B6), one or more face buttons (B1, B2, B3, B4), a right trigger (T2), a right finger button (FB2), a directional stick (C7), a touch pad, etc.

When positioned as shown in FIG. 4B, third control group 410 may be referred to, for example, as an upper tray. In other embodiments, third control group 410 may be positioned in other locations in UI control layout 401, including a left or right side of UI control layout 401, as well as a middle or lower location on UI control layout 401. Third control group 410 may comprise any number and combination of controls, such as the first through fourth controls C1-C4. For instance, in an embodiment, third control group 410 may include back, guide and start controls, one or more menu access controls, etc. In embodiments, a control in UI control layout 401 may have any graphical form factor, including being displayed and interactable as a button, a touch pad, a switch, a D-pad, a stick, etc. In an example, controls in third control group 410 may fade out when right and/or left control groups 408, 412 are in use and return (e.g., after a delay), for example, upon inactivity.

UI layout manager 406 may be selected, for example, to leave active UI control mode to access a UI layout manager menu. UI layout manager may manage many (e.g., tens, hundreds) of control layouts created for many different applications based on one or more socket templates. A user may select UI layout manager 406, for example, to edit first control layout 401, select a different control layout in the same group to use or edit, browse a library of control layouts in various groups, etc.

FIG. 5 shows an example of an interface control manager and a first layout group, according to an example embodiment. FIG. 5 shows an example of UI layout manager menu 500, which may be accessed, for example, by selecting UI layout manager 406 from the example screen shown in FIG. 4B. Example layout manager 500 is one of many possible examples to manage multiple control layouts for one or more control applications. Other examples may implement different options and screens.

Example UI manager menu 500 may show a representation 400A of first control layout 401, along with menu options. Representation 400A may comprise, for example, a highlighted, reduced size and/or inactive (e.g., unresponsive) version of first control layout 401. First control layout 401 may be associated with a label (e.g., a title or name) In an example, (e.g., as shown in FIG. 4B), first control layout is labeled "Standard" in a first group of control layouts. In an example, a second control layout in the first group is labeled "Custom1." A representation 700B of Custom1 may be shown in UI manager menu 500. An indication may be provided (e.g., a highlighted triangle under Standard) to illustrate which control layout in the group is selected (e.g., and may become active upon exiting UI manager menu 500).

Menu navigation options may include, for example, exit 514, edit 516, library 518, and options to select a different UI control layout (e.g., control layout named "Custom1") in the present group of layouts.

Selecting exit 514 (e.g., without making any other selection) may, for example, exit UI manager menu 500 and return to active control mode with Standard/first layout 401 as the active/in-use control layout, e.g., as shown by example in FIG. 4B.

Figure 6:
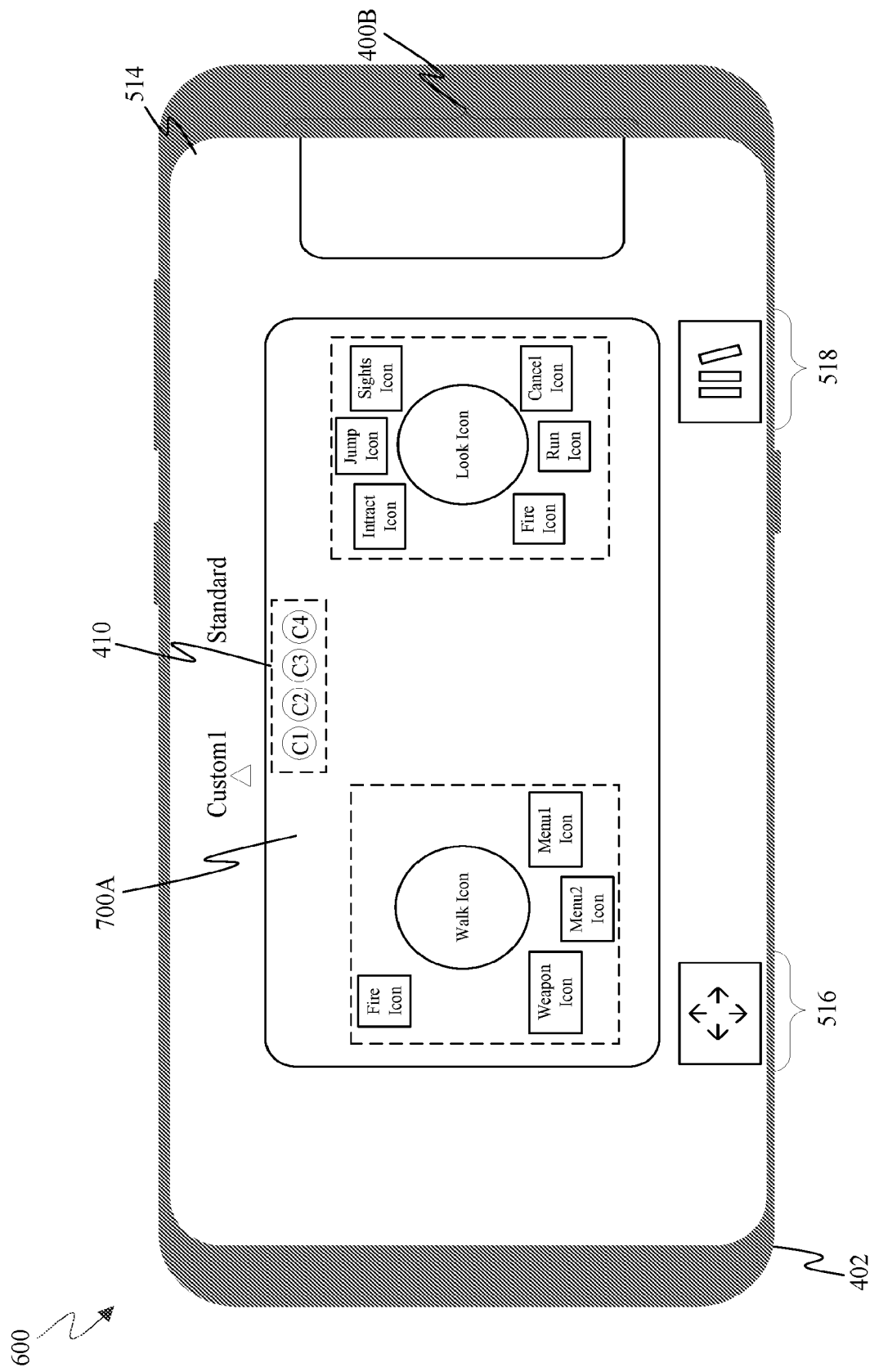
FIG. 6 shows an example of selecting a second control layout in the first layout group on a touch screen, according to an embodiment.
Figure 7:
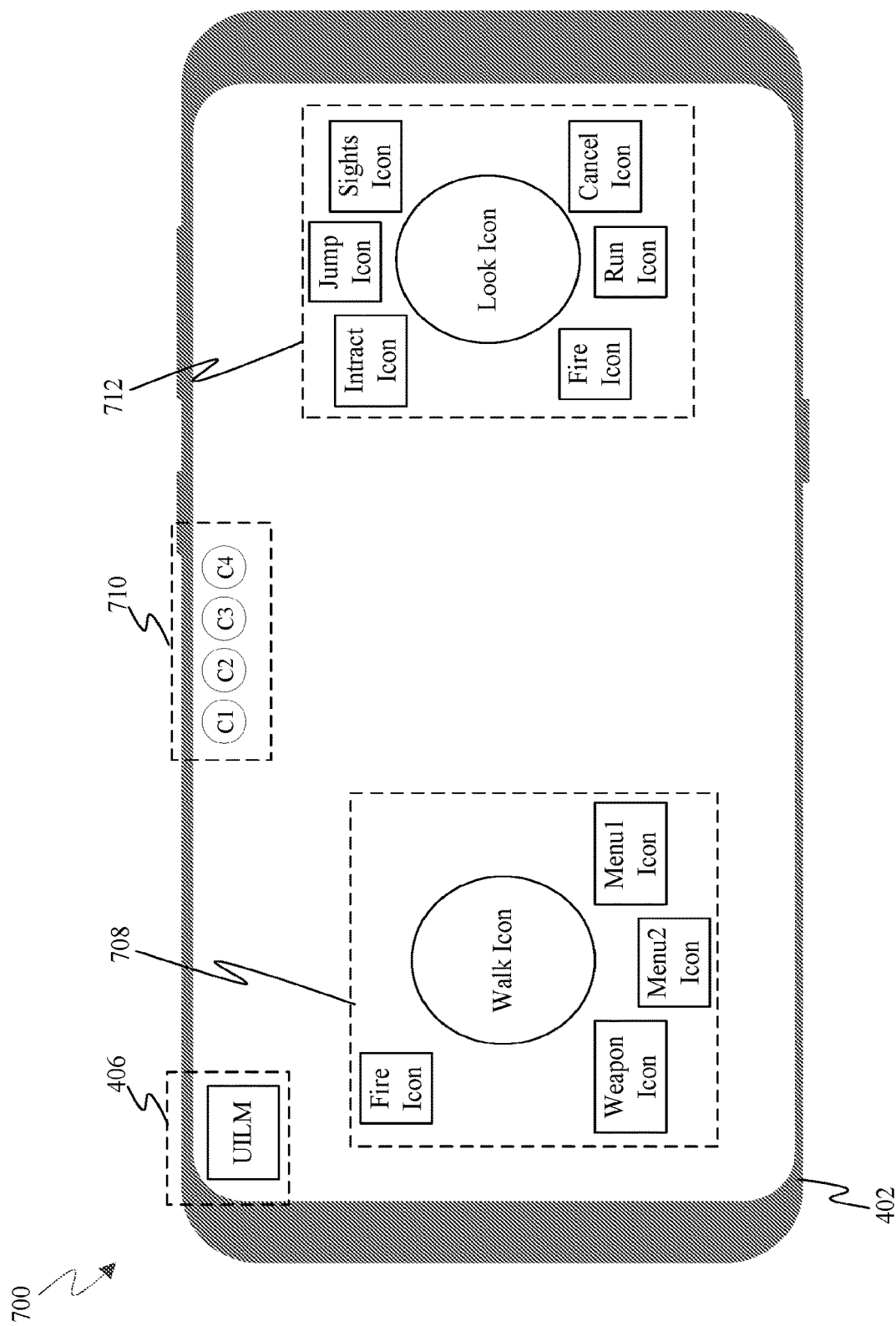
FIG. 7 shows an example of an active second control layout on a touch screen, according to an embodiment.

Selecting Custom1 may, for example, replace Standard representation 400A with a representation of Custom1 as the selected control layout in the group. A user may select the Custom1 control layout, for example, by selecting (e.g., touching displayed controls on touchscreen 402) "Custom1" or representation 700B of Custom1. Selecting exit 514 (e.g., after selecting Custom1) may, for example, exit UI manager menu 500 to active control mode with Custom1 control layout as the active/in-use control layout. FIGS. 6 and 7 show examples of these selections.

Selecting edit 516 may, for example, open a layout editor to edit the selected control layout, which, as shown in FIG. 5, is "Standard" or first control layout 401. A user may, e.g., alternatively, select Custom1 then select edit 516 to edit Custom1 or select library 518, select any control layout in the library and select edit to select another control layout. FIG. 8 shows an example of selecting edit 516 to edit first control layout (labeled "Standard") 401 while FIGS. 9 and 10 show editing of first control layout (labeled "Standard") 401.

Figure 14:
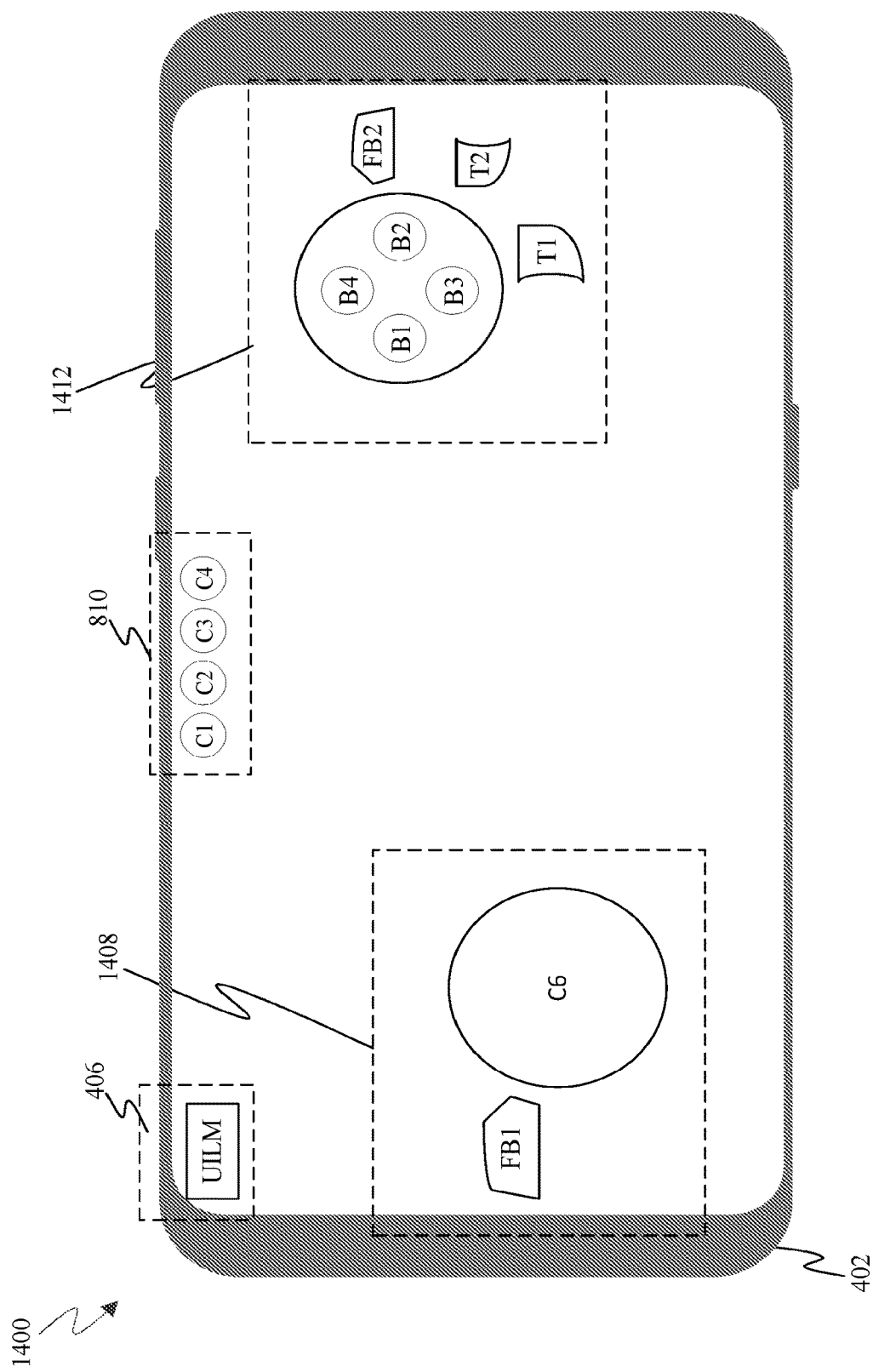
FIG. 14 shows an example of sharing customization of a first control layout in a first layout group with a first control layout in a second layout group on a touch screen, according to an embodiment.
Figure 15:
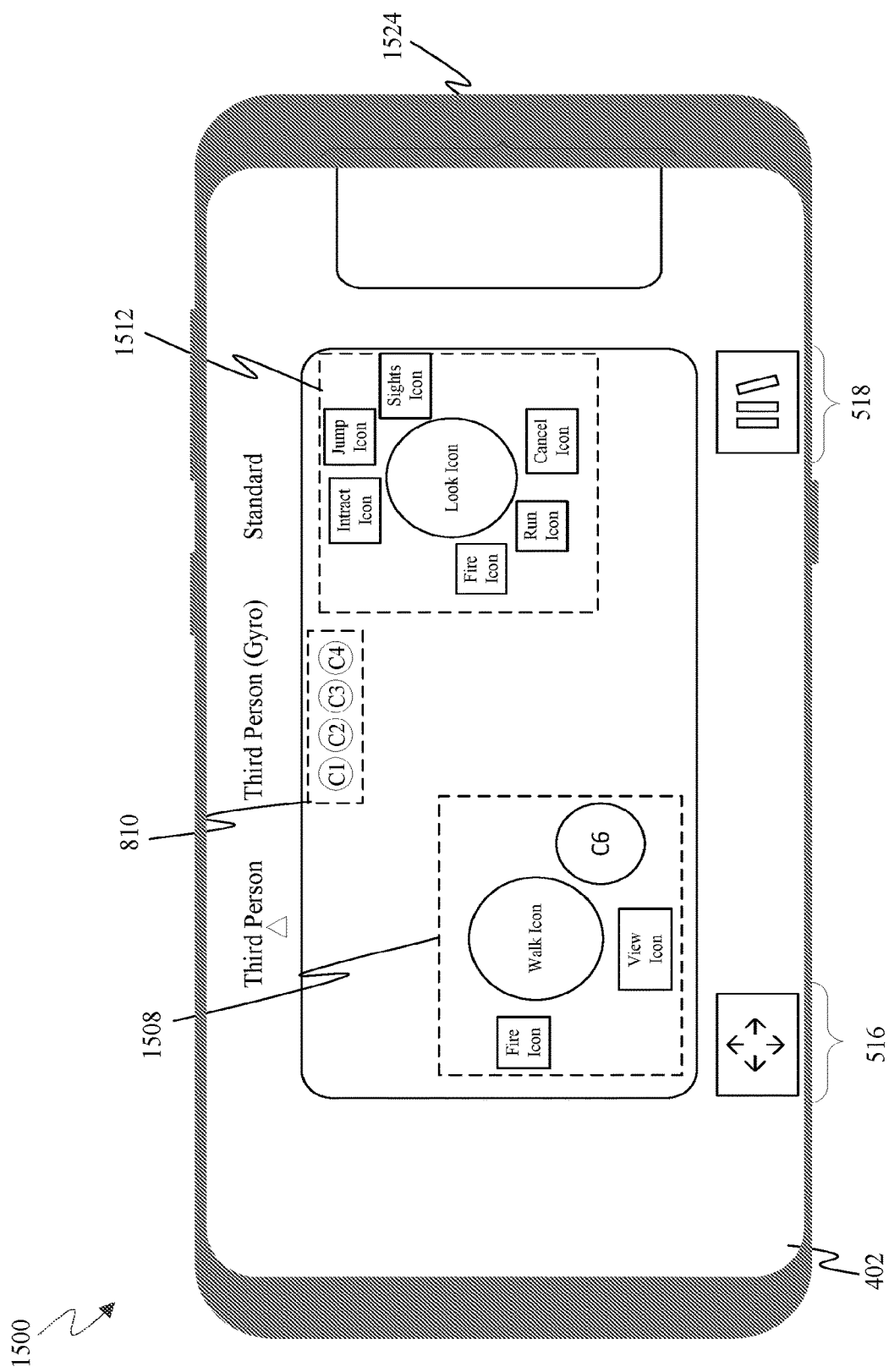
FIG. 15 is an example of sharing customization of a first control layout in a first layout group with a first control layout in a third layout group on a touch screen, according to an embodiment.

Selecting library 518 may open a library of control layouts to browse and select. FIG. 13 shows an example of selecting library 518, while FIGS. 14 and 15 show control layouts from different groups selected from the library of control layouts.

FIG. 6 shows an example of selecting a second control layout in the first layout group, according to an example embodiment. FIG. 6 shows an example of selecting Custom1 in example layout manager menu 500.

Example UI manager menu display 600 may show a representation 700A of second control layout (Custom1) 700, along with menu options. Representation 700A may comprise, for example, a highlighted, reduced size and/or inactive (e.g., unresponsive) version of second control layout 700. A representation 400B of unselected first control layout (Standard) may be shown in UI manager menu display 600. An indication may be provided (e.g., a highlighted triangle under Custom1) to illustrate which control layout in the group is selected (e.g., and may become active upon exiting UI manager menu display 600).

Menu navigation options may include, for example, exit 514, edit 516, library 518, and options to select a different UI control layout (e.g., first control layout "Standard") in the present (e.g., first) layout group.

Selecting exit 514 (e.g., without making any other selection) may, for example, exit UI manager menu to active control mode with second control layout Custom1 700 as the active/in-use control layout, e.g., as shown by example in FIG. 7.

Selecting Standard may, for example, return to manager menu 500. A user may select the Standard control layout, for example, by selecting (e.g., touching displayed controls on touchscreen 402) "Standard" or representation 400B of Standard. Selecting exit 514 (e.g., after selecting Standard) may, for example, exit UI manager menu 600 to active control mode with Standard control layout as the active/in-use control layout, e.g., as shown by example in FIG. 4B.

Selecting edit 516 may, for example, open a layout editor to edit the selected control layout, which, as shown in FIG. 6, is second control layout Custom1. A user may, alternatively select Standard then select edit 516 to edit Standard or select library 518, select any control layout in the library and select edit to select another control layout. FIG. 8 shows an example of selecting Standard then edit 516 to edit first control layout (Standard) 401 while FIGS. 9 and 10 show editing of first control layout (labeled "Standard") 401.

Selecting library 518 may open a library of control layouts to browse and select. FIG. 13 shows an example of selecting library 518, while FIGS. 14 and 15 show control layouts from different groups selected from the library of control layouts.

FIG. 7 shows an example of an active second control layout, according to an example embodiment. Example (e.g., second) UI control layout 700 may be displayed on (e.g., positioned and scaled for) any display device. In an example, (e.g., as shown in FIG. 7), second control layout (Custom1) 700 in a first layout group may be displayed on a touch screen device display 402 (e.g., smart phone, tablet). Second control layout 700 shows controls assigned to control sockets (e.g., in a control socket template).

A user may interact with controls in second control layout 700 to provide user input that may be processed to control real and/or virtual objects. Second UI control layout 700 may comprise, for example, UI layout manager 406, first control group 708, second control group 712 and third control group 410.

First control group 708 may be referred to, for example, as a left or left hand (LH) control group or wheel. Second control group 712 may be referred to, for example, as a right or right hand (RH) control group or wheel. Third control group 710 may be referred to, for example, as upper tray 710.

FIG. 8 shows an example of the first control layout in a layout editor, according to an example embodiment. Example layout editor 800 shows an editable representation 400C of first control layout (Standard) 401. Editable representation 400C comprises editable first control group 808 and editable second control group 812. UI layout manager 406 and third control group 810 may or may not be editable in various embodiments.

Editable first control group 808 may be referred to, for example, as editable left or left hand (LH) control group or wheel. Editable first control group 808 may comprise, for example, left joystick (C5), left stick press (B5), directional pad (C6), left trigger (T1) and left finger button (FB1). Editable first control group 808 may (e.g., further) comprise customization controls, e.g., first group rotation and scale control 814 and first group position control 816.

First group rotation and scale control 814 may comprise, for example, a selectable ring in the vicinity of, on or around editable first control group 808. First group position control 816 may comprise, for example, a selectable area inside first group rotation and scale control 814 (e.g., a central area of editable first control group 808). A user may select first group rotation and scale control 814 or first group position control 816, for example, by touching and holding any point on a selectable area.

Editable second control group 812 may be referred to, for example, as editable right or right hand (RH) control group or wheel. Editable second control group 812 may comprise, for example, right joystick (C7), right stick press (B6), face buttons (B1, B2, B3, B4), right trigger (T2) and right finger button (FB2). Editable second control group 812 may (e.g., further) comprise customization controls, e.g., second group rotation and scale control 818 and second group position control 820.

Second group rotation and scale control 818 may comprise, for example, a selectable ring in the vicinity of, on or around editable second control group 812. Second group position control 820 may comprise, for example, a selectable area inside second group rotation and scale control 818 (e.g., a central area of editable second control group 812). A user may select second group rotation and scale control 818 or first group position control 820, for example, by touching and holding any point on a selectable area.

A user may customize first control layout 401, for example, by interacting with customization controls (e.g., first group rotation and scale control 814, first group position control 816, second group rotation and scale control 818 and second group position control 820).

In an example, a user may selectively edit a position, rotation and scale of editable first control group 808 and editable second control group 812. A user may, for example, simultaneously customize editable first control group 808 and editable second control group 812.

For example, a user may select first group rotation and scale control 814 (e.g., by touching and holding any point on the ring defined by first group rotation and scale control 814. Dragging the held position clockwise or counterclockwise (e.g., along the ring defined by first group rotation and scale control 814) may, respectively, rotate editable first control group 808 right or left. Dragging the held position away from or towards the center of editable first control group 808 may, respectively, expand or contract (increase or decrease) the scale of editable first control group 808. An increase in scale, may increase distances between controls while a decrease in scale may reduce distances between controls.

For example, a user may select first group position control 816 (e.g., by touching and holding any point in a selectable area defined by first group position control 816. Dragging the held position (e.g., in any direction) may move editable first control group 808.

A size of socket/control active areas and/or control icons may be customized, for example, by specifying user preferences (e.g., small, medium, large, extra-large).

Customization of a UI control layout may (e.g., selectively and/or automatically) be applied to other UI control layouts (e.g., with the same socket template, in the same group, for the same type or category of UI control applications, in all UI control layouts, and so on). Customization may automatically apply with or without user selection. In an example, a user may specify applicability of customization generally (e.g., in user preferences) and/or specifically (e.g., per customization session).

As previously presented (e.g., in FIG. 3 discussion about selectively customizing control locations in sockets), a user may customize one or more controls (e.g., in first editable control group 808, editable second control group 812 and so on) by moving a control from a first socket to a second socket (e.g., as shown by examples in FIGS. 2 and 3). A user may, for example, select (e.g., touch and hold) a control (e.g., in first or second control groups) and drag it to a new location (e.g., in first or second control groups).

A user may choose to customize, for example, for comfort, for dominant hand or for any other purpose. For example, hand and finger dimensions may vary dramatically from child to child and adult to adult. Similarly, computer devices and how they are held may vary from device to device and user to user. A left-handed user may, for example, swap sides of editable first control group 808 and editable second control group 812. A user may choose to accept or reject customization, for example, by selecting done control 920 or reset control 922.

FIG. 9 shows an example of scaling and rotating the left control group in the first control layout, according to an example embodiment. Example layout editor display 900 shows a user selected first group rotation and scale control 814 and dragged the held position away from the center of editable first control group 808 and counterclockwise (e.g., down and to the right) to position 914, which had the effect of increasing the scale of editable first control group 808 (e.g., increasing active touch area of sockets/controls and/or spacing between controls) and rotating the positions of left stick press (B5), directional pad (C6), left trigger (T1) and left finger button (FB1) counterclockwise. These edits created customized first control group 908. A user may continue dragging position 914 to continue changing the configuration, including to the starting configuration of editable first control group 808. A user may release position 914 and re-select for further editing. A user may select reset control 822 to return editable first and second control groups to their configurations at the beginning of the edit session or select done control 820 to save customizations.

FIG. 10 shows an example of simultaneously repositioning right and left control groups in the first control layout, according to an example embodiment. Customized first control layout 1000 shows first group position control 816 was selected and dragged downward to position 1016 while second group position control 820 was selected and dragged upward to position 1020, which had the effect of moving editable first control group 808 down and editable second control group 812 up. These edits created customized first control group 1008 and customized second control group 1012. A user may continue dragging positions 1016 and 1020 to continue changing the configuration, including to the starting configuration of editable first control group 808. A user may release positions 1016 and/or 1020 and re-select for further editing. A user may select reset control 822 to return editable first and second control groups to their configurations at the beginning of the edit session or select done control 820 to save customizations.

FIGS. 11-15 present examples based on a user selecting done control 822 to accept customized first control layout 1000 shown in FIG. 10.

Figure 11:
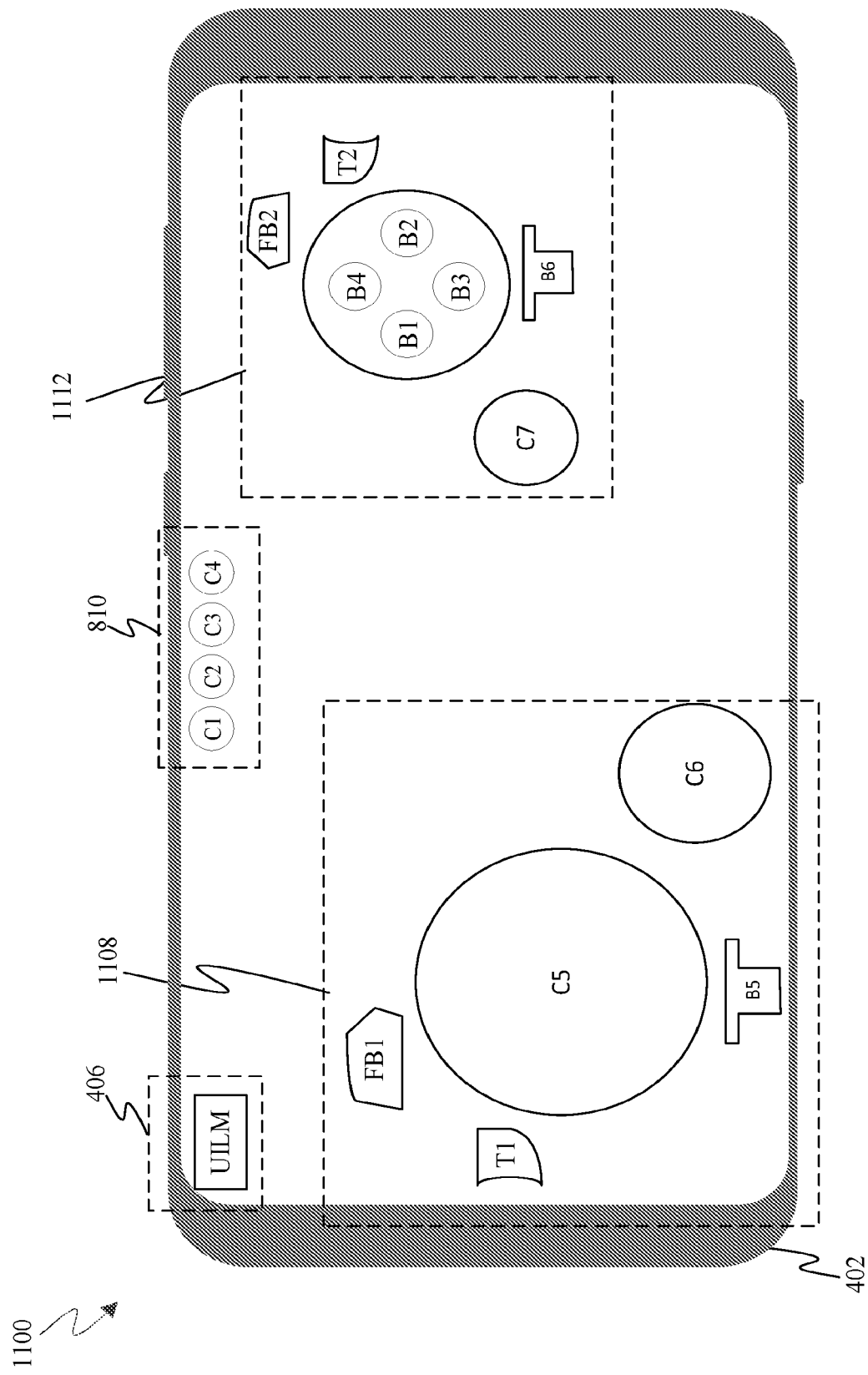
FIG. 11 shows an example of an activated customized version of the first control layout on a touch screen, according to an embodiment.

FIG. 11 shows an example of an activated customized version of the first control layout, according to an example embodiment. Example customized first UI control layout 1100 may be compared to first UI control layout 401. It may be observed (e.g., by comparison of FIG. 4B to FIG. 11), that the differences between first (e.g., left) control group 408 and customized first control group 1108 comprise downward repositioning, counterclockwise rotation, and expanded scale. It may be observed (e.g., by comparison of FIG. 4B to FIG. 11), that the differences between second (e.g., right) control group 412 and customized second control group 1112 comprise upward repositioning, clockwise rotation, and expanded scale. It may be observed (e.g., by comparison of FIG. 4B to FIG. 11), that center control sockets with face buttons (e.g., B1, B2, B3, B4 controls) did not rotate with right joystick (C7), right stick press (B6), right trigger (T2) and right finger button (FB2). Rotation (e.g., of center sockets/controls) may be selectable, for example, generally (e.g., in user preferences) and or specifically (e.g., per customization session).

UI layout manager 406 may be selected, for example, to leave active UI control mode displaying customized first UI control layout 1100 to access other UI control layouts via a UI layout manager menu.

FIGS. 12-15 may illustrate application of customization to a first UI control layout in a first layout group (e.g., customization of first control layout 401 to customized first control layout 1100) to other UI control layouts in the same group and other groups, e.g., for other applications, thereby providing customization across applications. Customization may be (e.g., selectively) universal or global (e.g., for all UI control layouts), for example, that are based on the same or similar socket template and/or other layout similarities.

Figure 12:
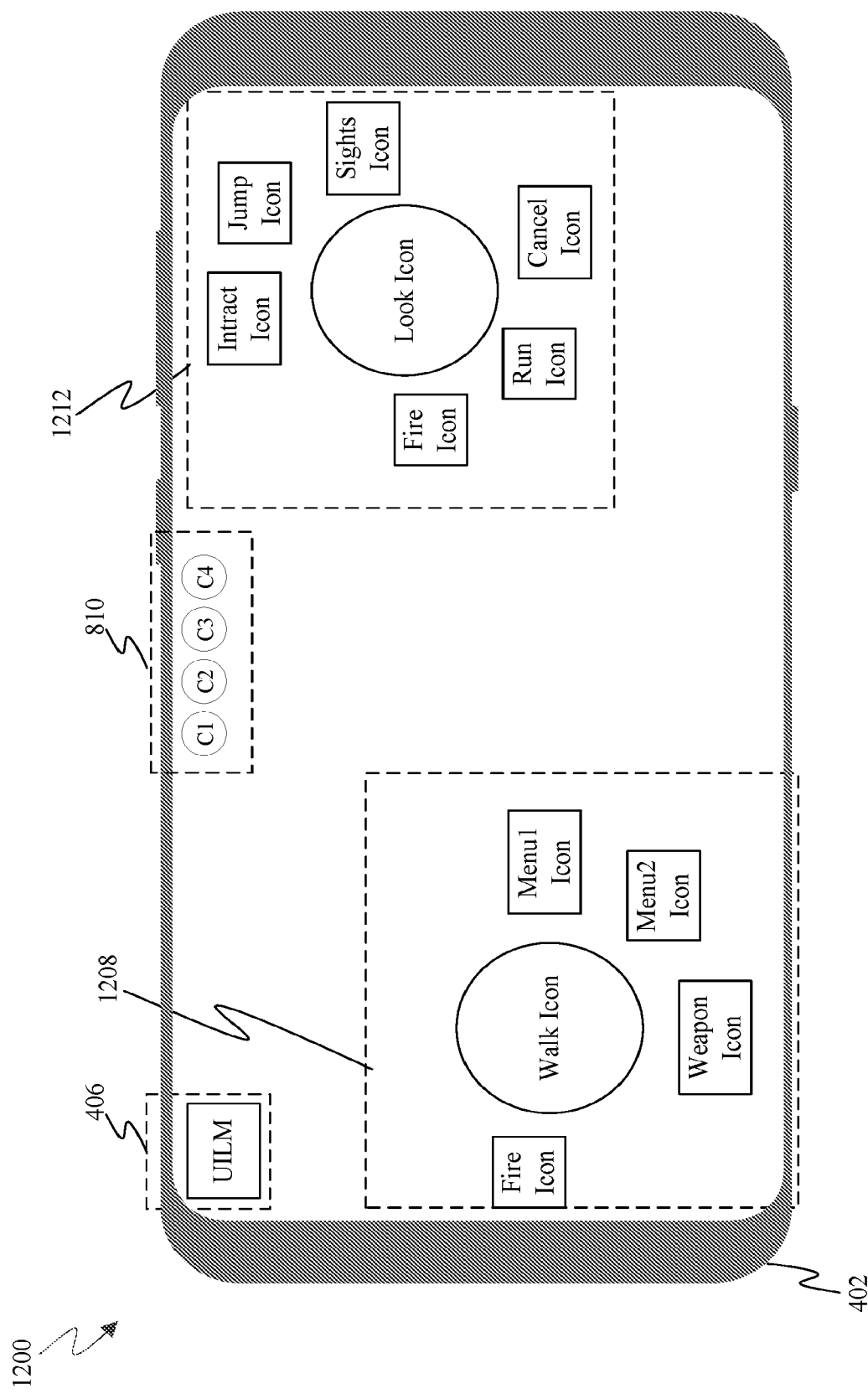
FIG. 12 shows an example, on a touch screen, of sharing the customization of the first control layout with the second control layout in the same layout group by repositioning, scaling and rotating the right and left control groups, according to an embodiment.

FIG. 12 shows an example of sharing the customization of the first control layout with the second control layout in the same layout group by repositioning, scaling and rotating the right and left control groups, according to an example embodiment. FIG. 12 shows example customized second UI control layout (customized Custom1) 1200. Customized Custom1 1200 may be compared to Custom1 700. It may be observed that Custom1 700 has been customized without editing Custom1 700. Similar to the comparison of customized Standard 1100 to Standard 401, it may be observed (e.g., by comparison of FIG. 7 to FIG. 12), that the differences between first (e.g., left) control group 708 and customized first control group 1208 comprise downward repositioning, counterclockwise rotation, and expanded scale. It may be observed (e.g., by comparison of FIG. 7 to FIG. 12), that the differences between second (e.g., right) control group 712 and customized second control group 1212 comprise upward repositioning, clockwise rotation, and expanded scale.

Sharing customization may, for example, implement (e.g., broadcast) user customization on multiple user interface controls, thereby avoiding time-consuming customization of each control in each user interface, control by control, application by application.

FIG. 13 shows an example of browsing a library of groups of control layouts, according to an example embodiment. FIG. 13 shows an example library browsing menu 1300 displayed, for example, upon selection of library 518 in UI layout manager menu 500. Example list of UI layout groups 1307 visible on touch screen 402 includes, for example, the following groups: Sports, FPS/TPS (first person shooter/third person shooter), Action, Racing, Puzzle, and Adventure. A user may, for example, scroll up and down to see other groups of UI layouts. In an example, UI layout groups may be organized (e.g., as groups) based on application titles or types or genres of applications (e.g., Sports video game, FPS/TPS video game, Action video game, Racing video game, Puzzle video game and Adventure video game). A (e.g. each) group may have zero or more subgroups (e.g. with UI default and custom controls for specific application titles). In other implementations, UI layout groups may be organized (e.g., as groups) based on any organizational characteristic(s) (e.g., by socket template, by type of controls and so on). Searches may be performed, for example, to find, select and/or organize UI control layouts, e.g., based on features or characteristics. A user may navigate and select, for example, a UI control layout from the Action group, e.g., as shown by example in FIG. 14, or UI control layouts from the War group, e.g., as shown by example in FIG. 15.

FIG. 14 shows an example of sharing customization of a first control layout in a first layout group with a first control layout in a second layout group, according to an example embodiment. FIG. 14 shows customized UI control layout 1400 from the Action group selected from the library shown in FIG. 13. In an example, customized UI control layout 1400 was customized (e.g., based on customization of first and second control groups 408, 412 in first control layout 401 to customized first and second control layouts 1108, 1112 in customized first control layout 1200) by downward repositioning, counterclockwise rotation, and expanded scale of first (e.g., left) control group 1408 and upward repositioning, clockwise rotation, and expanded scale of second control group 1412.

FIG. 15 is an example an example of sharing customization of a first control layout in a first layout group with a first control layout in a third layout group, according to an example embodiment. FIG. 15 shows a customized UI control layout from the War group selected from the library shown in FIG. 13. The War layout group is shown in layout manager menu 1500. War group comprises three UI control layouts (e.g., Third Person, Third Person (Gyro) and Standard). The Third Person UI control layout is selected. A portion of a reduced size, highlighted customized version of the Third Person UI control layout is shown with first and second control groups 1508, 1512. A reduced size customized version of Third Person (Gyro) UI control layout 1524 is also shown. In an example, customized Third Person UI control layout was customized (e.g., based on customization of first and second control groups 408, 412 in first control layout 401 to customized first and second control layouts 1108, 1112 in customized first control layout 1200) by downward repositioning, counterclockwise rotation, and expanded scale of first (e.g., left) control group 1508 and upward repositioning, clockwise rotation, and expanded scale of second control group 1512.

Figure 16:
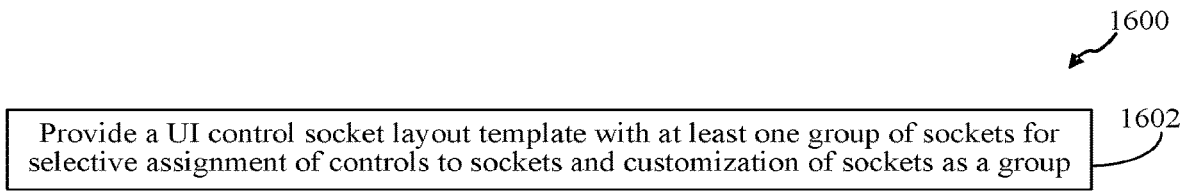
FIG. 16 shows a flowchart of an example method for providing a control socket template, according to an embodiment.

Embodiments may also be implemented in processes or methods. For example, FIG. 16 shows a flowchart of an example method for providing a control socket template, according to an example embodiment. Embodiments disclosed herein and other embodiments may operate in accordance with example method 1600. Method 1600 comprises step 1602. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 1600. FIG. 16 is simply one of many possible embodiments. Embodiments may implement fewer, more or different steps.

Method 1600 comprises step 1602. In step 1602, a UI socket template may be provided with a group (e.g., cluster) of sockets (e.g., a socket group). Controls may be selectively assigned to portions and/or entireties of sockets. Sockets (e.g., and assigned controls) may be selectively customized (e.g., as a group). For example, as shown in FIG. 1, platform developer 102 may provide a UI socket template with at least one socket group (e.g., as shown by example in FIG. 2), which App Developer 104 may utilize to create a UI control layout for an application (e.g., a game) by selectively assigning controls to whole and/or fractional portions of sockets (e.g., as shown by example in FIG. 3). App developer 104 may provide content applications (content apps), e.g., with UIs, 140 to one or more computing devices 106, 136. User 134 may interact with content apps 140 using the UIs, which may be managed by UI layout manager 108. User 134 may customize a UI, for example, by changing a position, rotation and/or scale of one or more control groups created using one or more socket groups.

Figure 17:
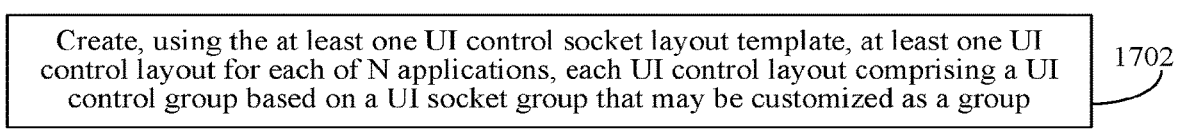
FIG. 17 shows a flowchart of an example method for providing a control layout for an application, according to an embodiment.

FIG. 17 shows a flowchart of an example method for providing a control layout for an application, according to an example embodiment. Embodiments disclosed herein and other embodiments may operate in accordance with example method 1700. Method 1700 comprises step 1702. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 1700. FIG. 17 is simply one of many possible embodiments. Embodiments may implement fewer, more or different steps.

Method 1700 comprises step 1702. In step 1702, at least one UI control layout may be created (e.g., using the at least one UI control socket layout template) for each of N applications. Each UI control layout may comprise a UI control group based on a UI socket group that may be customized as a group. For example, as shown in FIG. 1, App Developer 104 may utilize a UI socket template with at least one socket group (e.g., as shown by example in FIG. 2) to create one or more UI control layouts for an application (e.g., a game) by selectively assigning controls to whole and/or fractional portions of sockets (e.g., as shown by example in FIG. 3). App developer 104 may provide content applications (content apps) 140 to one or more computing devices 106, 136. App develop may provide UIs alone or with content apps. User 134 may interact with content apps 140 using the UIs, which may be managed by UI layout manager 108. User 134 may customize a UI, for example, by changing a position, rotation and/or scale of one or more control groups created using one or more socket groups.

Figure 18:
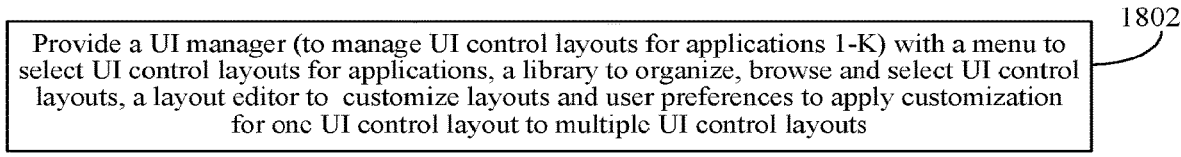
FIG. 18 shows a flowchart of an example method for providing a control layout manager, according to an embodiment.

FIG. 18 shows a flowchart of an example method for providing a control layout manager, according to an example embodiment. Embodiments disclosed herein and other embodiments may operate in accordance with example method 1800. Method 1800 comprises step 1802. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 1800. FIG. 18 is simply one of many possible embodiments. Embodiments may implement fewer, more or different steps.

Method 1800 comprises step 1802. In step 1802, a UI manager may be provided to manage UI control layouts for applications 1-K. A UI manager may have a menu to select UI control layouts for applications, a library to organize, browse and select UI control layouts, a layout editor to customize layouts and user preferences to apply customization for one UI control layout to multiple UI control layouts. For example, as shown in FIG. 1, platform developer 102 may provide UI layout manager 108 to user devices to manage UIs developed by app developer 104. UI layout manager 108 may comprise UI layout menu 110 (e.g., as shown by example in FIG. 5) to select UI control layouts (e.g., Standard and Custom1). UI layout manager 108 may comprise UI layout library 114 (e.g., as shown by example in FIG. 13) to organize, browse and select UI control layouts (e.g., UI control layouts in layout groups 1307). UI layout manager 108 may comprise layout editor 112 (e.g., as shown by example in FIGS. 8-10) to customize layouts (e.g., Standard layout 401 to customized Standard layout 1100). UI layout manager 108 may comprise UI layout preferences 116 to apply customization for one UI control layout to multiple UI control layouts (e.g., as shown by examples in FIGS. 12, 14 and 15).

Figure 19:
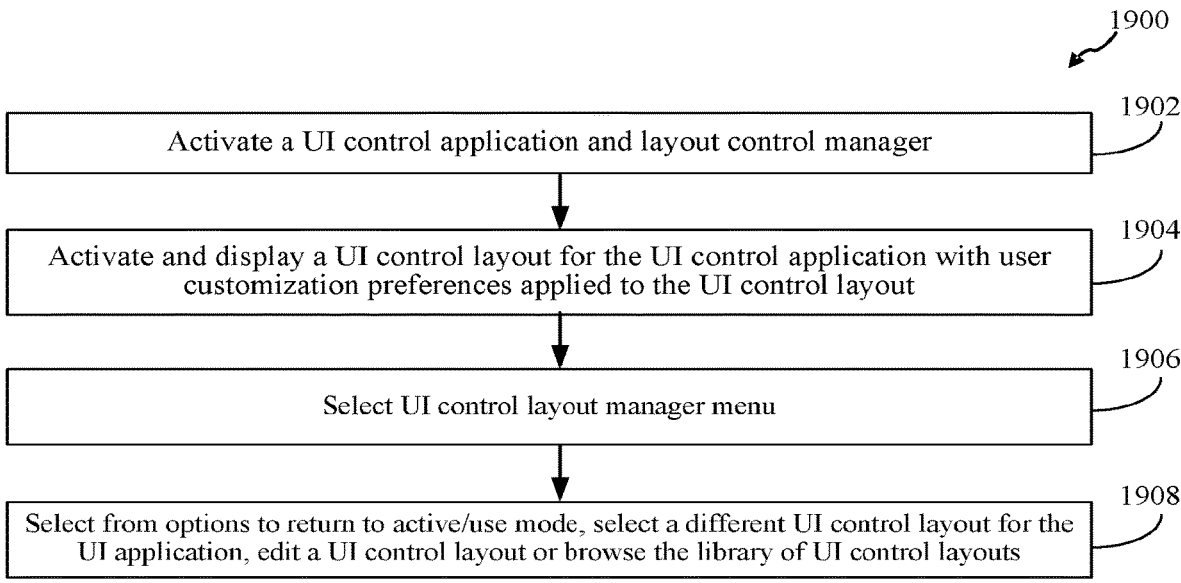
FIG. 19 shows a flowchart of an example method for using a control layout manager to select a control layout, according to an embodiment.

FIG. 19 shows a flowchart of an example method 1900 for using a control layout manager to select a control layout, according to an example embodiment. Embodiments disclosed herein and other embodiments may operate in accordance with example method 1900. Method 1900 comprises steps 1902-1908. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 1900. FIG. 19 is simply one of many possible embodiments. Embodiments may implement fewer, more or different steps.

Method 1900 comprises step 1902. In step 1902, a UI control application and layout control manager may be started. For example, as shown in FIG. 1, user 134 may interact with touch screen 124 to direct computing device 106 or computing device 136 to open content application (e.g., by selecting the content app from content apps 140). UI layout manager 108 may be, for example, running already, called by the content app or selected to run by user 134. In an example, a user may open an Xbox gaming application with access to many different game application titles that may be run locally, streamed locally or stream over the Internet. UI layout manager 108 may, for example, be integrated in an Xbox gaming application. User 134 may select content app 140 through another application (e.g., an Xbox gaming application). Each game application may be associated with (e.g., a unique) UI control layout that may be displayed on display screen 118 and/or display screen 148. In another example, a user may open a flying drone control application, where a drone may provide video and user 134 interacts with a displayed UI control layout to control one or more virtual or physical objects associated with the drone (e.g., drone direction, speed, elevation, camera, gimbal, camera zoom or focus and so on). In another application, user 134 may open a robotic control application. A UI control layout may be displayed to user 134 who may view and control a robot in person (e.g., using a touch screen UI).

In step 1904, a UI control layout for the UI control application may be activated and displayed with user customization preferences applied to the UI control layout. For example, as shown in FIG. 1, a UI control layout may be activated, for example, when UI control app 140 and/or UI layout manager 108 is/are activated. A UI control layout may be embedded in and activated by content App 140 or separately selected and activated, e.g., user 134 interacting with UI layout manager 108. As shown by example in FIG. 12, a UI control layout (e.g., Custom1 layout 700) may be activated with user customization preferences as customized Custom1 layout 1200 based on user customization preferences created by customizing a different UI control layout (e.g., Standard layout 401 modified to customized Standard layout 1100).

In step 1906, UI control layout manager menu may be selected. For example, as shown in FIG. 1, user 134 may interact with touch screen 134 to select UI layout menu 110 shown in displayed content 122 on display screen 118 of computing device 106 (e.g., smart phone or tablet computer). As shown in FIG. 4B, user 134 may select UI layout manager 406.

In step 1908, a selection may be made (e.g., in UI layout manager) to return to active/use mode, select a different UI control layout for the UI application, edit a UI control layout or browse the library of UI control layouts. For example, as shown in FIG. 5, user 134 may select exit ("X") to return to active/use mode (e.g., as shown by example in FIG. 4B), select Custom1 layout then exit to activate Custom1 layout as a UI for an application (e.g., as shown by example in FIG. 7), select edit mode 516 to edit the Standard layout (e.g., as shown by examples in FIGS. 8-10) or select library mode 518 to browse the library of UI control layouts (e.g., as shown by example in FIG. 13).

Figure 20:
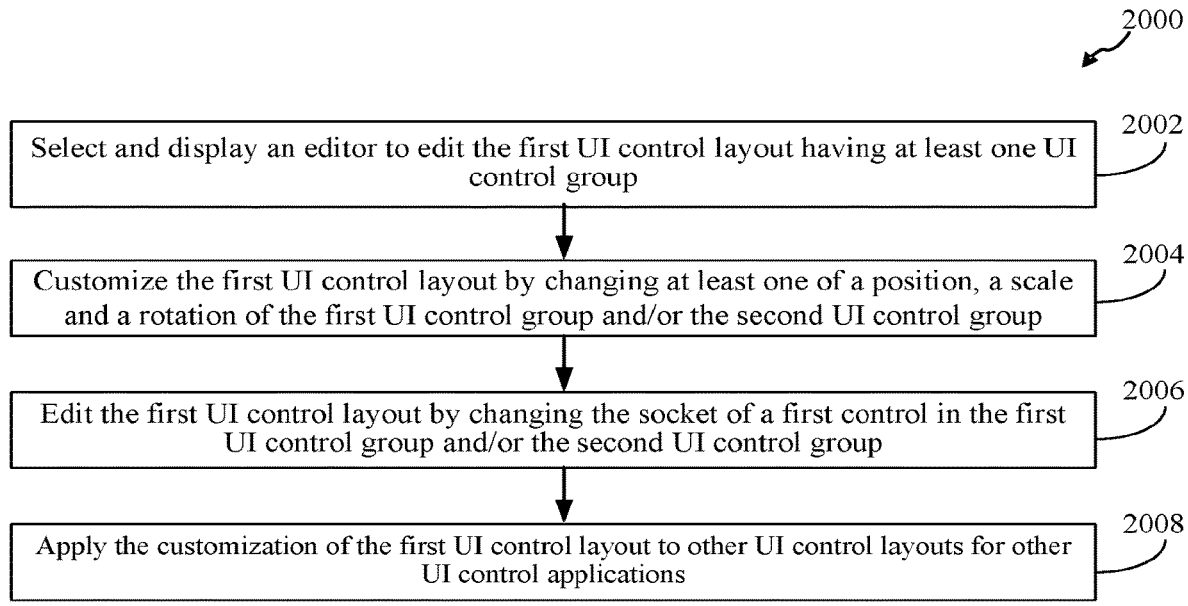
FIG. 20 shows a flowchart of an example method for editing a control layout, according to an embodiment.

FIG. 20 shows a flowchart of an example method for editing a control layout, according to an example embodiment. Embodiments disclosed herein and other embodiments may operate in accordance with example method 2000. Method 2000 comprises steps 2002-2008. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 2000. FIG. 20 is simply one of many possible embodiments. Embodiments may implement fewer, more or different steps.

Method 2000 comprises step 2002. In step 2002, an editor may be opened to edit a first UI control layout having at least one UI control group. For example, as shown in FIGS. 1 and 5, user 134 may select editor 516 to edit Standard layout. An example of UI layout editor 112 is shown in FIG. 8. Example layout editor 800 shows an editable representation 400C of first control layout (Standard layout) 401. Editable representation 400C comprises editable first control group 808 and editable second control group 812.

In step 2004, the first UI control layout may be customized by changing at least one of a position, a scale and a rotation of the first UI control group and/or the second UI control group. For example, as shown by example in FIG. 9, rotation and scale of first control group 808 was changed to customized first control group 908. As shown by example in FIG. 10, the positions of first and second control groups 808 and 812 was changed to customized first and second control groups 1008 and 1012.

In step 2006, the first UI control layout may be edited by changing the socket of a first control in the first UI control group and/or the second UI control group. For example, as shown and discussed with respect to FIGS. 2, 3 and 8, user 134 may customize one or more controls (e.g., in first editable control group 808 and/or editable second control group 812) by moving a control from a first socket to a second socket (e.g., as shown by examples in FIGS. 2 and 3). A user may, for example, select (e.g., touch and hold) a control (e.g., in first or second control groups) and drag it to a new location (e.g., in first or second control groups). In an example, user 134 may swap the positions of RT control and RB control or move RB control from socket 0.0 (see, e.g., FIG. 3A) to socket 0.1.

In step 2008, customization of the first UI control layout may be applied to other UI control layouts for other UI control applications. For example, as shown in FIG. For example, as shown in FIG. 1, UI layout manager 108 may comprise UI layout preferences 116 to apply customization for one UI control layout to multiple UI control layouts (e.g., as shown by examples in FIGS. 12, 14 and 15). As shown by example in FIG. 12, a UI control layout (e.g., Custom1 layout 700) may be activated with user customization preferences as customized Custom1 layout 1200 based on user customization preferences created by customizing a different UI control layout (e.g., Standard layout 401 modified to customized Standard layout 1100).

Figure 21:
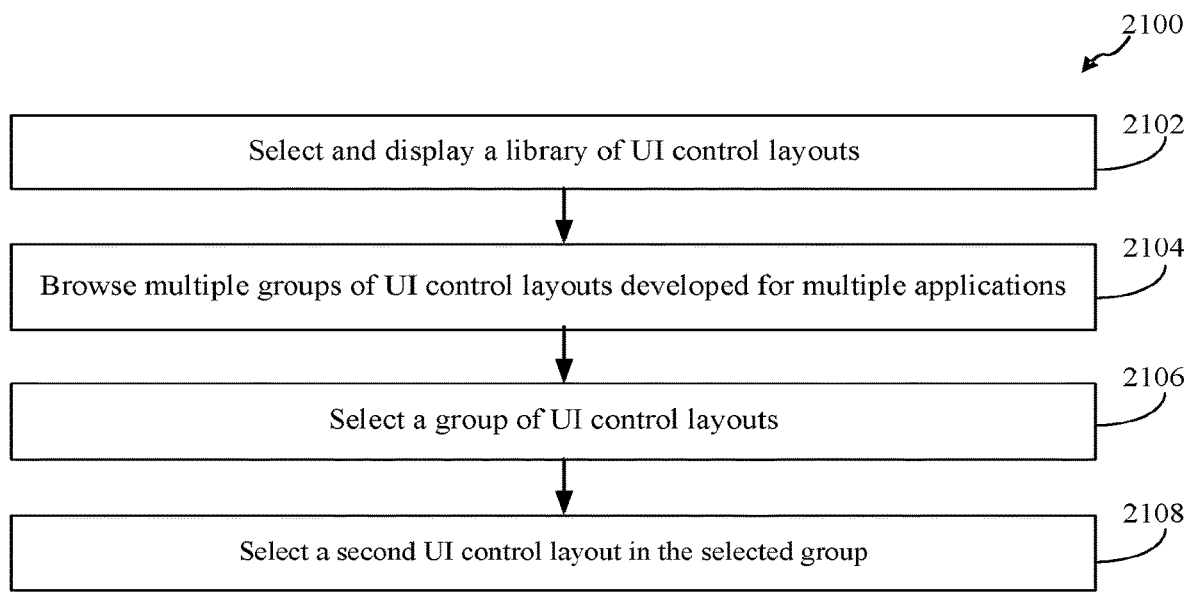
FIG. 21 shows a flowchart of an example method for browsing a library of control layouts, according to an embodiment.

FIG. 21 shows a flowchart of an example method 2100 for browsing a library of control layouts, according to an example embodiment. Embodiments disclosed herein and other embodiments may operate in accordance with example method 2100. Method 2100 comprises steps 2102-2108. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 2100. FIG. 21 is simply one of many possible embodiments. Embodiments may implement fewer, more or different steps.

Method 2100 comprises step 2102. In step 2102, a library of UI control layouts may be selected and displayed. For example, as shown in FIGS. 1, 5 and 13, user 134 may select UI layout library 114 by selecting library 516. As example of a user interface for library 114 is shown in FIG. 13.

In step 2104, multiple groups of UI control layouts developed for multiple applications may be browsed. For example, as shown in FIG. 13, user 134 may browse UI control layout groups 1307, e.g., by scrolling up and down, performing searches, selecting groups to view UI control layouts in the groups, etc.

In step 2106, a group of UI control layouts may be selected. For example, as shown in FIGS. 13 and 15, user 134 may select UI control layout group "War."

In step 2108, a second UI control layout may be selected from the selected group. For example, user 134 may select "Third Person" UI control layout in group War, which may be displayed with customizations based on customization of a first UI control layout, such as Standard layout 401 modified to customized Standard layout 1100.

III. Example Mobile Device and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including in FIGS. 1-21, along with any modules, components and/or subcomponents thereof, as well as the flowcharts/flow diagrams described herein, including portions thereof, and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 22:
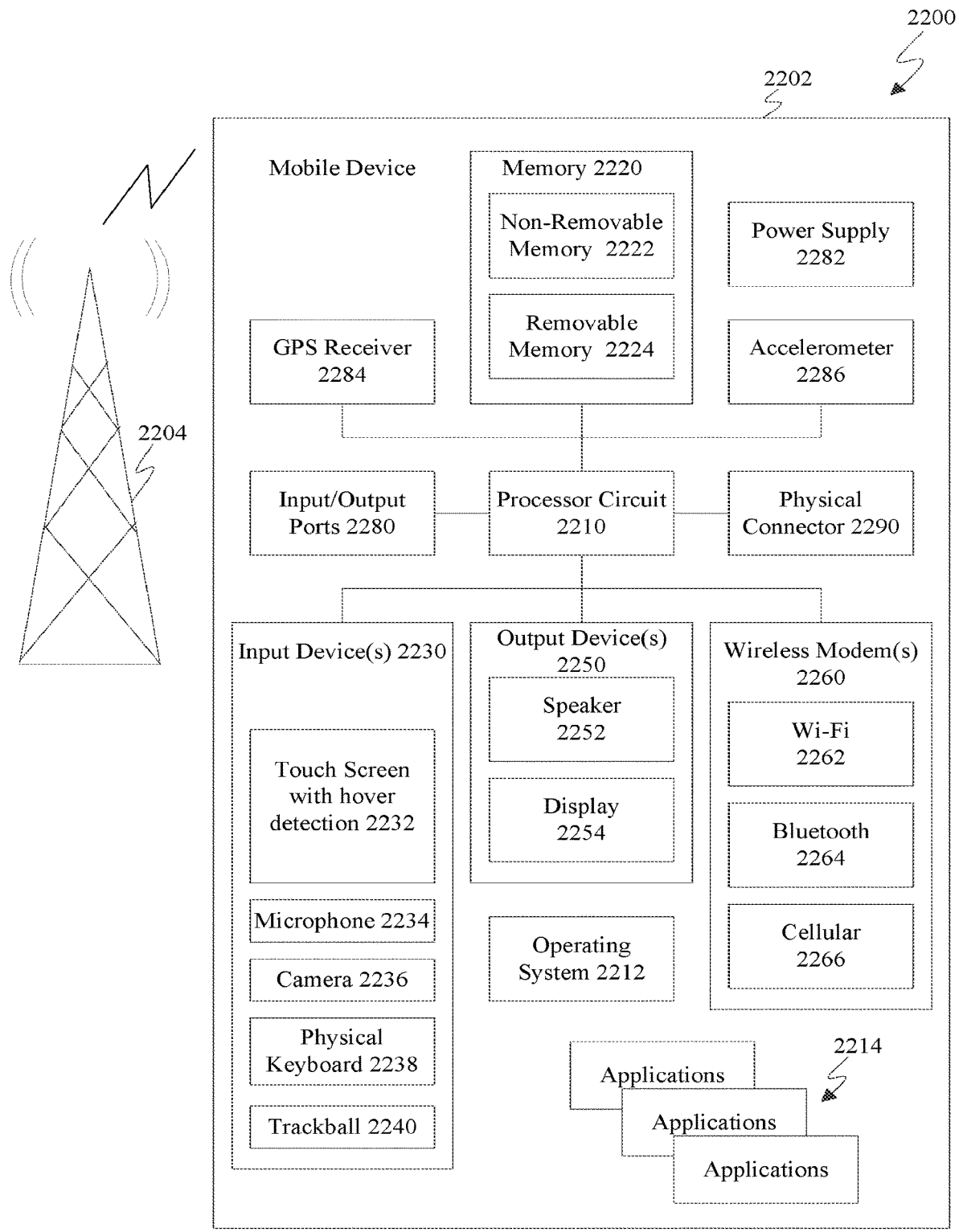
FIG. 22 shows a block diagram of an example mobile device that may be used to implement various embodiments.

FIG. 22 is a block diagram of an exemplary mobile system 2200 that includes a mobile device 2202 that may implement embodiments described herein. For example, mobile device 2202 may be used to implement any system, client, or device, or components/subcomponents thereof, in the preceding sections. As shown in FIG. 22, mobile device 2202 includes a variety of optional hardware and software components. Any component in mobile device 2202 can communicate with any other component, although not all connections are shown for ease of illustration. Mobile device 2202 can be any of a variety of computing devices (e.g., cell phone, smart phone, handheld computer, Personal Digital Assistant (PDA), etc.) and can allow wireless two-way communications with one or more mobile communications networks 2204, such as a cellular or satellite network, or with a local area or wide area network.

Mobile device 2202 can include a controller or processor 2210 (e.g., signal processor, microprocessor, ASIC, or other control and processing logic circuitry) for performing such tasks as signal coding, data processing, input/output processing, power control, and/or other functions. An operating system 2212 can control the allocation and usage of the components of mobile device 2202 and provide support for one or more application programs 2214 (also referred to as "applications" or "apps"). Application programs 2214 may include common mobile computing applications (e.g., e-mail applications, calendars, contact managers, web browsers, messaging applications) and any other computing applications (e.g., word processing applications, mapping applications, media player applications).

Mobile device 2202 can include memory 2220. Memory 2220 can include non-removable memory 2222 and/or removable memory 2224. Non-removable memory 2222 can include RAM, ROM, flash memory, a hard disk, or other well-known memory devices or technologies. Removable memory 2224 can include flash memory or a Subscriber Identity Module (SIM) card, which is well known in GSM communication systems, or other well-known memory devices or technologies, such as "smart cards." Memory 2220 can be used for storing data and/or code for running operating system 2212 and application programs 2214. Example data can include web pages, text, images, sound files, video data, or other data to be sent to and/or received from one or more network servers or other devices via one or more wired or wireless networks. Memory 2220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 2220. These programs include operating system 2212, one or more application programs 2214, and other program modules and program data. Examples of such application programs or program modules may include, for example, computer program logic (e.g., computer program code or instructions) for implementing one or more of system 100 of FIG. 1, along with any components and/or subcomponents thereof, as well as the flowcharts/flow diagrams described herein, including portions thereof, and/or further examples described herein.

Mobile device 2202 can support one or more input devices 2230, such as a touch screen 2232, a microphone 2234, a camera 2236, a physical keyboard 2238 and/or a trackball 2240 and one or more output devices 2250, such as a speaker 2252 and a display 2254. Other possible output devices (not shown) can include piezoelectric or other haptic output devices. Some devices can serve more than one input/output function. For example, touch screen 2232 and display 2254 can be combined in a single input/output device. Input devices 2230 can include a Natural User Interface (NUI).

One or more wireless modems 2260 can be coupled to antenna(s) (not shown) and can support two-way communications between processor 2210 and external devices, as is well understood in the art. Modem 2260 is shown generically and can include a cellular modem 2266 for communicating with the mobile communication network 2204 and/or other radio-based modems (e.g., Bluetooth 2264 and/or Wi-Fi 2262). At least one wireless modem 2260 is typically configured for communication with one or more cellular networks, such as a GSM network for data and voice communications within a single cellular network, between cellular networks, or between the mobile device and a public switched telephone network (PSTN).

Mobile device 2202 can further include at least one input/output port 2280, a power supply 2282, a satellite navigation system receiver 2284, such as a Global Positioning System (GPS) receiver, an accelerometer 2286, and/or a physical connector 2290, which can be a USB port, IEEE 2294 (FireWire) port, and/or RS-232 port. The illustrated components of mobile device 2202 are not required or all-inclusive, as any components can be deleted and other components can be added as would be recognized by one skilled in the art.

In an embodiment, mobile device 2202 is configured to implement any of the above-described features of flowcharts herein. Computer program logic for performing any of the operations, steps, and/or functions described herein may be stored in memory 2220 and executed by processor 2210.

Figure 23:
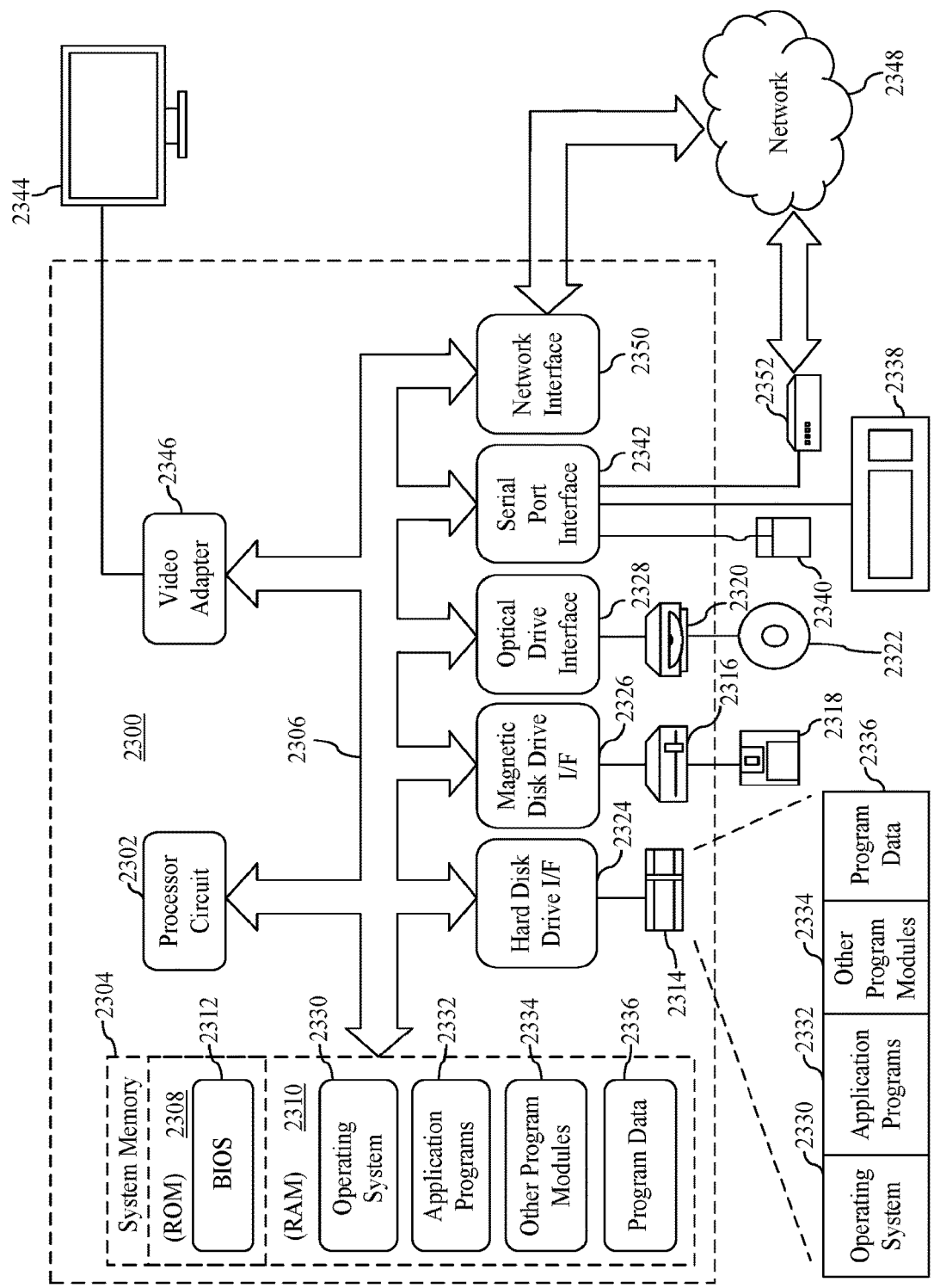
FIG. 23 shows a block diagram of an computing device that may be used to implement various embodiments.

FIG. 23 depicts an exemplary implementation of a computing device 2300 in which embodiments may be implemented. For example, embodiments described herein may be implemented in one or more computing devices similar to computing device 2300 in stationary or mobile computer embodiments, including one or more features of computing device 2300 and/or alternative features. The description of computing device 2300 provided herein is provided for purposes of illustration, and is not intended to be limiting. Embodiments may be implemented in further types of computer systems and/or game consoles, etc., as would be known to persons skilled in the relevant art(s).

As shown in FIG. 23, computing device 2300 includes one or more processors, referred to as processor circuit 2302, a system memory 2304, and a bus 2306 that couples various system components including system memory 2304 to processor circuit 2302. Processor circuit 2302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 2302 may execute program code stored in a computer readable medium, such as program code of operating system 2330, application programs 2332, other programs 2334, etc. Bus 2306 represents one or more of any of several types of bus structures, including a memory bus or memory controller, a peripheral bus, an accelerated graphics port, and a processor or local bus using any of a variety of bus architectures. System memory 2304 includes read only memory (ROM) 2308 and random access memory (RAM) 2310. A basic input/output system 2312 (BIOS) is stored in ROM 2308.

Computing device 2300 also has one or more of the following drives: a hard disk drive 2314 for reading from and writing to a hard disk, a magnetic disk drive 2316 for reading from or writing to a removable magnetic disk 2318, and an optical disk drive 2320 for reading from or writing to a removable optical disk 2322 such as a CD ROM, DVD ROM, or other optical media. Hard disk drive 2314, magnetic disk drive 2316, and optical disk drive 2320 are connected to bus 2306 by a hard disk drive interface 2324, a magnetic disk drive interface 2326, and an optical drive interface 2328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 2330, one or more application programs 2332, other programs 2334, and program data 2336. Application programs 2332 or other programs 2334 may include, for example, computer program logic (e.g., computer program code or instructions) for implementing embodiments described herein, along with any modules, components and/or subcomponents thereof, as well as the flowcharts/flow diagrams described herein, including portions thereof, and/or further examples described herein.

A user may enter commands and information into the computing device 2300 through input devices such as keyboard 2338 and pointing device 2340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 2302 through a serial port interface 2342 that is coupled to bus 2306, but may be connected by other interfaces, such as a parallel port, game port, or a universal serial bus (USB).

A display screen 2344 is also connected to bus 2306 via an interface, such as a video adapter 2346. Display screen 2344 may be external to, or incorporated in computing device 2300. Display screen 2344 may display information, as well as being a user interface for receiving user commands and/or other information (e.g., by touch, finger gestures, virtual keyboard, etc.). In addition to display screen 2344, computing device 2300 may include other peripheral output devices (not shown) such as speakers and printers.

Computing device 2300 is connected to a network 2348 (e.g., the Internet) through an adaptor or network interface 2350, a modem 2352, or other means for establishing communications over the network. Modem 2352, which may be internal or external, may be connected to bus 2306 via serial port interface 2342, as shown in FIG. 23, or may be connected to bus 2306 using another interface type, including a parallel interface.

As used herein, the terms "computer program medium," "computer-readable medium," and "computer-readable storage medium," etc., are used to refer to physical hardware media. Examples of such physical hardware media include the hard disk associated with hard disk drive 2314, removable magnetic disk 2318, removable optical disk 2322, other physical hardware media such as RAMs, ROMs, flash memory cards, digital video disks, zip disks, MEMs, nanotechnology-based storage devices, and further types of physical/tangible hardware storage media (including memory 2320 of FIG. 23). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 2332 and other programs 2334) may be stored on the hard disk, magnetic disk, optical disk, ROM, RAM, or other hardware storage medium. Such computer programs may also be received via network interface 2350, serial port interface 2342, or any other interface type. Such computer programs, when executed or loaded by an application, enable computing device 2300 to implement features of embodiments discussed herein. Accordingly, such computer programs represent controllers of the computing device 2300.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Example Embodiments

Methods, systems, and computer program products are provided for sharing user interface (UI) customization across applications. Application developers may create UIs (e.g., game control layouts) with control groups that may be customizable as a group. A control group may comprise a plurality of controls selectively assigned to cluster of sockets (e.g., a socket group) in a layout template. Controls in control groups may be customized as a group, for example, by changing a position, rotation and/or scale of a control group. Users can customize controls for comfort, switch controls for right and left-handed play and share customized preferences across applications. UI customization may be shared across applications with different UIs. For example, customization of one or more control groups in a first UI may be (e.g., automatically) applied to one or more control groups in other UIs for other applications. Users may avoid tedious, time-consuming individual control changes for many UIs.

In an example, a method of sharing UI customization across applications may comprise, for example, providing a first UI configured with a first plurality of controls in a first layout; providing a second UI configured with a second plurality of controls in a second layout; and displaying, on a display device, the second UI with the second plurality of controls in a customized layout based on a customized layout of the first plurality of controls. The second plurality of controls may be different from the first plurality of controls.

In an example, the first UI may comprise a first control group, which may comprise the first plurality of controls that are customizable as a group. The second UI may comprise a second control group, which may comprise the second plurality of controls that are customizable as a group.

In an example, the method may (e.g., further) comprise, customizing the first UI by changing at least one of a position, a rotation and a scale of the first control group.

In an example, the first control group may be based on a first socket group comprising a plurality of control socket. The first plurality of controls may be selectively assigned to the plurality of control sockets. The second control group may be based on a second socket group comprising a plurality of control sockets. The second plurality of controls may be selectively assigned to the plurality of control sockets.

In an example, the first socket group may be part of a first template with a plurality of socket groups. The second socket group may be part of a second template with a plurality of socket groups.

In an example, the first UI may comprise a plurality of control groups, e.g., based on the plurality of socket groups in the first template. The second UI may comprise a plurality of control groups, e.g., based on the plurality of socket groups in the second template.

In an example, the method may (e.g., further) comprise, customizing the first UI by changing at least one of a position, a rotation and a scale of each of the plurality of control groups. In an example, the customizing of the first and second control groups may be simultaneous.

In an example, the first control group may be configured to display on a first side of a display and at least one other control group may be configured to display on a second side of the display. In an example, customization of the first UI may comprise moving the first control group to the second side of the display; and moving the at least one other control group to the first side of the display.

In an example, the first UI may be configured for a first application; and the second UI may be configured for a second application.

In an example, the method may (e.g., further) comprise, customizing the first UI by moving a first control in the first control group from a first socket to a second socket in the first socket group. In an example, the first control may be assigned to plurality of sockets in the first socket group.

In an example, the method may (e.g., further) comprise, receiving user input from the second UI displayed on the computing device for a first application; switching from the second UI to a first UI by browsing a library and selecting the first UI from a plurality of UIs in the library; and receiving user input from the second UI displayed on the computing device for the first application.

In an example, the method may (e.g., further) comprise, displaying the second UI on the display device as an overlay over displayed content generated based on a first application.

In an example, a computer-readable medium may have program code recorded thereon that, when executed by at least one processor, causes the at least one processor to perform a method. In an example, the method may comprise, for example, providing, for display on a display device, a first user interface (UI) configured with a first control group comprising a first plurality of controls that are customizable as a group by changing at least one of a position, a rotation and a scale of the first control group.

In an example, the method may (e.g., further) comprise, providing, for display on a display device, a second UI configured with a second control group comprising a second plurality of controls that are customizable as a group; and customizing the second UI by changing at least one of a position, a rotation and a scale of the second control group based on a customization of the first UI. The second plurality of controls may be different from the first plurality of controls.

In an example, the first UI may be configured for a first application; and the second UI may be configured for a second application.

In an example, the first control group may be based on a first socket group comprising a plurality of control sockets. The first plurality of controls may be selectively assigned to the plurality of control sockets. The second control group may be based on a second socket group comprising a plurality of control sockets. The second plurality of controls may be selectively assigned to the plurality of control sockets.

In an example, a system may comprise at least one computing device configured to provide, for display on a display device, a first user interface (UI) configured for a first application and configured with a first control group comprising a first plurality of controls that are customizable as a group. The at least one computing device may be configured to apply customization of the first control group in the first UI to a second control group in a second UI, the second control group comprising a second plurality of controls that are customizable as a group, wherein the second plurality of controls is different from the first plurality of controls.

In an example, the at least one computing device may be (e.g., further) configured to provide, for display on a display device, a UI editor configured to provide customization of a UI configured with a control group by changing at least one of a position, a rotation and a scale of the control group.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A method, comprising:
providing a first user interface (UI) configured with a first plurality of controls in a first layout, the first plurality of controls including a particular first control configured for use with a first application, the particular first control being provided at a particular location in the first UI;
providing a second UI configured with a second plurality of controls in a second layout, wherein the second plurality of controls includes a particular second control configured for use with a second application, the particular second control being provided at the particular location in the second UI; and
in response to a customization input received while the first UI is displayed without the second UI:
performing a first instance of a particular layout modification to the first layout to obtain a customized first layout of the first UI; and
automatically performing a second instance of the particular layout modification to the second layout to obtain a customized second layout of the second UI,
wherein the first instance of the particular layout modification involves performing a particular movement of the particular first control relative to other controls in the first layout in response to the customization input, and the second instance of the particular layout modification involves automatically performing the particular movement of the particular second control relative to other controls in the second layout in the absence of explicit customization input directed to the particular second control.

2. The method of claim 1, wherein the first application is a first video game, the second application is a second video game, and the particular first control and the particular second control are configured to provide different user gaming inputs to the first and second video games, respectively.

3. The method of claim 2, further comprising:
controlling the first video game with a computing device using the first UI having the customized first layout; and
controlling the second video game with the computing device using the second UI having the customized second layout.

4. The method of claim 1, wherein the particular first control is part of a first group of multiple controls of the first layout, the particular second control is part of a second group of multiple controls of the second layout, the first instance of the particular layout modification is performed to the first group of multiple controls, and the second instance of the particular layout modification is performed to the second group of multiple controls.

5. The method of claim 4, wherein the first instance of the particular layout modification involves a downward repositioning of the first group of multiple controls relative to another group of multiple controls in the first layout, and the second instance of the particular layout modification involves a downward repositioning of the second group of multiple controls relative to another group of multiple controls in the second layout.

6. The method of claim 4, wherein the first instance of the particular layout modification involves expanding a scale of the first group of multiple controls and the second instance of the particular layout modification involves expanding a scale of the second group of multiple controls.

7. The method of claim 1, further comprising:
displaying the first UI with the customized first layout on a computing device; and
responsive to user input, removing the first UI and switching to displaying the second UI with the customized second layout on the computing device.

8. The method of claim 7, further comprising:
displaying a library of available control layouts on the computing device, including at least the customized first layout of the first UI and the customized second layout of the second UI.

9. A system comprising:
one or more processors; and
one or more computer-readable storage media storing instructions which, when executed by the one or more processors, cause the one or more processors to:
determine that a first instance of a particular customization has been performed to a particular first control of a first user interface (UI) while the first UI is displayed without a second UI, the first UI being configured to control a first application and being provided at a particular location in the first UI;
access the second UI, wherein the second UI is configured to control a second application other than the first application, the second UI having a particular second control provided at the particular location in the second UI; and
in the absence of explicit customization input directed to the particular second control of the second UI, automatically apply a second instance of the particular customization to the particular second control,
wherein the first instance of the particular customization involves a particular movement of the particular first control relative to other controls in the first UI in response to a customization input, and the second instance of the particular customization involves performing the particular movement on of the particular second control relative to other controls in the second UI.

10. The system of claim 9, wherein the first UI and the second UI are separate UIs configured for display on a display screen at different times and to control different applications at different times.

11. The system of claim 9, wherein the particular first control is part of a first group of multiple controls of the first UI, the particular second control is part of a second group of multiple controls of the second UI, the first instance of the particular customization is performed to the first group of multiple controls, and the second instance of the particular customization is performed to the second group of multiple controls.

12. The system of claim 11, wherein the first instance of the particular customization involves a downward repositioning of one control in the first group of multiple controls relative to another control in the first group of multiple controls, and the second instance of the particular customization involves a downward repositioning of one control in the second group of multiple controls relative to another control in the second group of multiple controls.

13. The system of claim 11, wherein the first instance of the particular customization involves expanding a scale of the first group of multiple controls and the second instance of the particular customization involves expanding a scale of the second group of multiple controls.

14. The system of claim 9, further comprising a touch screen configured to display the first UI and the second UI at different times.

15. The system of claim 14, wherein the instructions, when executed by the one or more processors, cause the one or more processors to:

perform the first instance of the particular customization responsive to user input to the touch screen while the first UI is displayed and the second UI is not displayed.

16. A computer-readable medium having program code recorded thereon that, when executed by at least one processor, causes the at least one processor to perform acts comprising:

displaying a first user interface (UI) configured with a first plurality of controls in a first layout, the first plurality of controls including a particular first control configured for use with a first application, the particular first control being provided at a particular location in the first UI;

providing a second UI configured with a second plurality of controls in a second layout, wherein the second plurality of controls includes a particular second control configured for use with a second application, the particular second control being provided at the particular location in the second UI; and in response to a customization input received while the first UI is displayed without the second UI:

performing a first instance of a particular layout modification to the first layout to obtain a customized first layout of the first UI; and automatically performing a second instance of the particular layout modification to the second layout to obtain a customized second layout of the second UI, wherein the first instance of the particular layout modification involves performing a particular movement of the particular first control relative to other controls in the first layout in response to the customization input, and the second instance of the particular layout modification involves automatically performing the particular movement of the particular second control relative to other controls in the second layout in the absence of explicit customization input directed to the particular second control.

17. The computer-readable medium of claim 16, the acts further comprising:

at a first time, displaying the first UI with the customized first layout and communicating first control inputs to the first application based on first user inputs directed to the first UI; and at a second time, replacing the first UI with the second UI having the customized second layout and communicating second control inputs to the second application based on second user inputs directed to the second UI.

18. The computer-readable medium of claim 17, wherein the first application comprises a first video game, the second application comprises as second video game, the particular first control comprises a particular first video game control, and the particular second control comprises a particular second video game control.

19. The computer-readable medium of claim 16, wherein the first and second instances of the particular layout modification move the particular first control and the particular second control from the same particular location to another new location on the first UI and the second UI, respectively.

20. The computer-readable medium of claim 16, the second UI being configured to replace the first UI and used separately from the first UI.

* * * * *